(12) United States Patent
Matsumoto

(10) Patent No.: US 7,773,392 B2
(45) Date of Patent: Aug. 10, 2010

(54) ISOLATED SWITCHING POWER SUPPLY APPARATUS

(75) Inventor: Tadahiko Matsumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 622 days.

(21) Appl. No.: 11/687,278

(22) Filed: Mar. 16, 2007

(65) Prior Publication Data

US 2007/0153554 A1 Jul. 5, 2007

Related U.S. Application Data

(63) Continuation of application No. PCT/JP2006/315710, filed on Aug. 9, 2006.

(30) Foreign Application Priority Data

Aug. 11, 2005 (JP) ............................. 2005-233507

(51) Int. Cl.
*H02M 3/335* (2006.01)
(52) U.S. Cl. ............... 363/21.07; 363/21.08; 363/21.15
(58) Field of Classification Search ... 363/21.06–21.08, 363/21.14–21.16
See application file for complete search history.

(56) References Cited

U.S. PATENT DOCUMENTS

| | | | |
|---|---|---|---|
| 6,185,114 B1* | 2/2001 | Matsumoto et al. | 363/21.06 |
| 6,445,598 B1* | 9/2002 | Yamada | 363/21.12 |
| 6,456,510 B1* | 9/2002 | Patel et al. | 363/21.06 |
| 6,487,059 B2* | 11/2002 | Bontempo et al. | 361/90 |
| 6,563,718 B1* | 5/2003 | Li et al. | 363/16 |
| 6,778,412 B2 | 8/2004 | Nagai et al. | |
| 6,879,499 B2* | 4/2005 | Matsumoto | 363/21.06 |
| 2005/0078492 A1* | 4/2005 | Takahashi | 363/21.15 |
| 2005/0105478 A1* | 5/2005 | Hwang et al. | 370/276 |
| 2005/0157522 A1* | 7/2005 | Osaka | 363/21.02 |

FOREIGN PATENT DOCUMENTS

| | | |
|---|---|---|
| FR | 2 560 697 A1 | 9/1985 |
| JP | 06-253534 A | 9/1994 |
| JP | 2003-088114 A | 3/2003 |
| JP | 2003-219638 A | 7/2003 |
| JP | 2004-208440 A | 7/2004 |
| JP | 2005-117814 A | 4/2005 |
| JP | 2005-512486 A | 4/2005 |
| JP | 2005-210759 A | 8/2005 |
| WO | 03/049267 A2 | 6/2003 |

OTHER PUBLICATIONS

Official Communication of PCT Application No. PCT/JP20061315710; mailed on Nov. 7, 2006.
Official communication issued in counterpart Chinese Application No. 200680000773.3, mailed on Aug. 29, 2008.

* cited by examiner

*Primary Examiner*—Jeffrey L Sterrett
*Assistant Examiner*—Fred E Finch, III
(74) *Attorney, Agent, or Firm*—Keating & Bennett, LLP

(57) ABSTRACT

A primary side is provided with an oscillation circuit arranged to turn on a power switch at a constant cycle. The secondary side is provided with an on period control circuit arranged to output an off signal for turning the power switch off by detecting output voltage and comparing with a reference triangle wave signal. An isolated signal transfer circuit is provided between the primary side and secondary side to transfer an on signal. The primary side is provided with a power switch off circuit arranged to turn off the power switch based on the on signal.

18 Claims, 13 Drawing Sheets

ISOLATED SWITCHING POWER SUPPLY APPARATUS

BACKGROUND OF THE INVENTION

1. Field of the Invention

The present invention relates to an isolated switching power supply apparatus, and particularly to an isolated switching power supply apparatus in which a controlled variable can be transferred from the secondary side to the primary side and direct control can be performed without using a photocoupler, and further which has good transient reactivity.

2. Description of the Related Art

FIG. 10 illustrates a circuit diagram (Conventional Example 1) of a conventional isolated switching power supply apparatus. The Conventional Example 1 is a single transistor type resonance reset forward converter having a fixed voltage output, using a conventional feedback method for the output voltage.

With the isolated switching power supply apparatus 100 shown in FIG. 10, a power transformer 3 includes a primary winding 3A and a secondary winding 3B. One end of the primary winding 3A is connected to a positive side input terminal 1, and the other side is connected to a negative side input terminal 2 via a power switch 4. The gate of the power switch 4 is connected to a PWM control IC 69.

The PWM control IC 69, which is a circuit for turning the power switch on and off, is provided at the primary side, and includes a comparator 71 and a ramp voltage waveform generating circuit 70 connected to the inverting input terminal thereof. A serial circuit including a resistor 73 and a phototransistor 74B is connected between a DC power source 72 and the negative side input terminal 2, with the contact point therebetween being connected to the non-inverting input terminal thereof.

One end of the secondary winding 3B is connected to a positive side output terminal 10, and the other end is connected to a negative side output terminal 11 via a rectification side synchronous rectifier 5 and choke coil 8 in that order. A smoothing capacitor 9 is connected between the positive side output terminal 10 and the negative side output terminal 11. A commutation side synchronous rectifier 6 is connected between the contact point between the rectification side synchronous rectifier 5 and choke coil 8, and one end of the secondary winding 3B. The gates of the rectification side synchronous rectifier 5 and commutation side synchronous rectifier 6 are connected to a synchronous rectifier driving circuit 7.

Connected between the positive side output terminal 10 and the negative side output terminal 11 are a serial circuit including a light-emitting diode 74A and a shunt regulator 75 and a serial circuit including a resistor 160 and a resistor 162, with the contact point between the resistor 160 and the resistor 162 being connected to the gate of the shunt regulator 75. The secondary side light-emitting diode 74A and the primary side photo-transistor 74B define the photocoupler 74.

With the isolated switching power supply apparatus 100, the power switch 4 connected via the primary winding 3A of the power transformer 3 switches the DC input voltage applied between the positive side input terminal 1 and negative side input terminal 2 so as to be converted into AC. The power transformer 3 transfers power from the primary winding 3A to the secondary winding 3B, rectification is performed at the rectification side synchronous rectifier 5 and commutation side synchronous rectifier 6, and smoothed at an output filter configured of the choke coil 8 and capacitor 9, thereby converting into DC again and outputting DC voltage from the positive side output terminal 10 and the negative side output terminal 11.

Regarding feedback of the output voltage, the voltage divided at the resistors 160 and 162 is compared to a reference voltage of the shunt regulator 75 and an error margin is generated as a DC signal, and the error signal is transferred in the DC state from the secondary side to the primary side by the photocoupler 74. At the primary side, the error signal is input to the PWM control IC 69, compared to the ramp voltage waveform generated by the ramp voltage waveform generating circuit 70 by the comparator 71, and a power switch driving signal which is a square wave subjected to PWM modulation is generated. The power switch 4 is driven following the on/off timing of the power switch driving signals, thereby stabilizing the output voltage, which is the controlled variable, to a specific voltage value.

FIG. 11 illustrates another circuit diagram (Conventional Example 2) of a conventional switching power supply apparatus. The Conventional Example 2 is shown in FIG. 8 in Japanese Unexamined Patent Application Publication No. 2004-208440 (Patent Document 1). The control method with the Conventional Example 2 is called hysteresis control, ripple control, or bang-bang control, and is generally known as a method with excellent responsivity to sudden fluctuation in input voltage and output voltage. Traditional hysteresis control determines the on-duty ratio of the power switch using output voltage ripple as the ramp voltage, and accordingly, the properties thereof tend to be dependent on the ESR (Equivalent Series Resistance) or ESL (Equivalent Series Inductance) of the smoothing capacitor. However, the Conventional Example 2 alleviates the effects with output by superimposing an integrated waveform of the comparator output on the ripple voltage.

While traditional hysteresis control is primarily used with non-isolated switching power sources, the circuit in FIG. 8 of Patent Document 1 applies hysteresis control to isolated switching power source, by driving the primary side power switch from the secondary side via isolation components such as driving transformer, capacitor. The Conventional Example 2 is an example wherein hysteresis control has been applied to a forward converter.

FIG. 12 illustrates yet another circuit diagram (Conventional Example 3) of a conventional switching power supply apparatus. The static regulation properties thereof are shown in FIGS. 13A and 13B. The positive half illustrates the region where current flows from the input side to the output side, and the negative illustrates the reverse current region where current flows from the output side to the input side. The Conventional Example 3 is disclosed in Japanese Unexamined Patent Application Publication No. 2003-88114 (Patent Document 2), with FIG. 12 and FIGS. 13A and 13B being respectively shown in FIG. 8 and FIG. 5 of Patent Document 2.

The Conventional Example 3 is a circuit which suppresses the amount of the current flowing reversely from the output side to the input side of an indirect control isolated switching power source using a synchronous rectifier. In the period wherein the reverse current flows reversely through the parasitic diode of the power switch, a period is created wherein the drain voltage is maintained at approximately 0 V even after the power switch driving signal is turned off, such that detection of a state wherein the gate voltage and drain voltage are both at the L level determines the state to be a reverse current state, and protective operations are performed so that the reverse current does not increase unless the output voltage is further increased, thereby obtaining static regulation properties such as shown in FIGS. 13A and 13B. The reverse current suppression circuit shown in the Conventional Example 3 suppresses the current amount with respect to reverse current wherein the current balance between isolated switching power sources operating in parallel collapses and current flows reversely from the output of one to the output of the other, and to reverse current occurring due to the stored charge in the smoothing capacitor following transient increase in output voltage due to rapid change in input or rapid change in load.

The photocoupler for transferring the error signals from the secondary circuit to the primary circuit in the Conventional Example 1 generally has an absolute maximum rated temperature of around 100° C., and accordingly, cannot be used with switching power sources with a wide temperature range of usage, when taking derating into consideration. The deterioration of CTR (Current Transfer Rate) over time is a problem regarding reliability.

Also, the traditional PWM control used with the Conventional Example 1 has problems of cutoff frequency of the output filter, cutoff frequency of the error amplifier, photocoupler transfer delay, and other problems, and transient responsivity is poor. Accordingly, there is the problem that the output voltage greatly changes with sudden fluctuations in input voltage and output current.

With the Conventional Example 2, an integrated waveform of the comparator output is superimposed on the ripple voltage, but effects of the output filter remain, and the switching frequency fluctuates depending on the output state. For example, adding a low-ESR smoothing capacitor to the output of the switching power source reduces the ripple voltage, such that the switching frequency drops. Also, the switching frequency fluctuates under transient fluctuations in output voltage. This circuit that the switching frequency changes according to the state of use, such that designing an isolated switching power source is difficult.

For example, if the switching frequency of the isolated switching power source fluctuates according to the state of use, there are restrictions in the design of the isolated switching power source, and further, main circuit types which can be used are limited. For example, with a resonance reset forward converter, reduction in frequency generates a surge voltage at the main switch, such that usage thereof is difficult. Also, the input/output filter needs to be designed for the lowest frequency, so a wide range of fluctuation of switching frequency leads to a large-sized input/output filter.

Also, The Configuration Example 2 includes a control circuit at the secondary side and drives the primary side power switch from the secondary side via isolation components, but the startup power for the secondary side control circuit cannot be supplied from the power transformer, such that a secondary startup power supply circuit must be provided, which is a separate path. The secondary startup power supply circuit is substantially a small-capacity isolated switching power source including a switching device, transformer and other elements, and accordingly is a large and expensive component. Further, the driving transformer defining the isolation components for transferring signals for controlling the power switch operate at the switching frequency, such that operation is performed at a relatively low frequency, requiring larger components.

Further, the hysteresis control does not have a circuit component for amplifying error signals, so static regulation properties are inferior to traditional PWM control, and there is the problem that this cannot handle strict stipulations on output voltage precision.

With the Conventional Example 3, a reverse current suppression circuit must be provided separately from the control circuit in order to suppress reverse current, requiring many more components, such that the circuit configuration becomes complex, which is problematic from the perspectives of cost and reduction in size.

SUMMARY OF THE INVENTION

To overcome the problems described above, preferred embodiments of the present invention provide an isolated switching power supply apparatus which includes a power transformer having at least a primary winding and a secondary winding, at least one power switch arranged to switch current flowing through the primary winding, and a rectifying circuit and a smoothing circuit connected to the secondary winding, wherein control is provided such that a controlled variable of output approaches a target value by controlling turning on and off of the power switch, and includes a timing signal output circuit, provided on the secondary side, arranged to output a timing signal for causing the power switch to perform a switching operation of one of turn-on or turn-off, based on a change in the controlled variable, a timing signal transfer circuit arranged to transfer the timing signal from the secondary side to the primary side in an isolated manner, and a power switch control circuit, provided to the primary side, arranged to cause the power switch to perform switching operations based on the timing signal.

The isolated switching power supply apparatus preferably further includes, at the primary side, an oscillation circuit arranged to output signals for switching the power switch at a certain cycle and a certain time ratio, wherein, in the event that a switching operation is performed by the timing signal, a signal for performing a switching operation in the same direction as the timing signal output from a oscillation circuit is masked. Moreover, the isolated switching power supply apparatus preferably further includes a multiple driving prevention circuit arranged to prevent switching of the power switch, in the event that a switching operation is performed by the timing signal, until a switching operation is performed in the reverse direction by a signal output from the oscillation circuit. At this time, the power switch may be turned on at a certain cycle with an output signal of the oscillation circuit and the power switch turned off with the timing signal, or the power switch may be turned off at a certain cycle with an output signal of the oscillation circuit and the power switch turned on with the timing signal.

Also, with the isolated switching power supply apparatus, the power switch is configured to automatically perform a switching operation opposite to the switching operation by the timing signal. At this time, the power switch is turned off with the timing signal, and the power switch is automatically turned on following an off period of a length corresponding to the on period.

Also, with the isolated switching power supply apparatus, the timing signal transfer circuit is a signal transformer provided between the primary side and the secondary side. Further, the signal transformer is defined by a composite magnetic component sharing the same core as a choke coil, which is a component of the power transformer or the smoothing circuit.

Also, with the isolated switching power supply apparatus, the timing signal transfer circuit is a signal transfer capacitor provided between the primary side and the secondary side. Moreover, the isolated switching power supply apparatus preferably further includes a multi-layer circuit substrate upon which the power transformer is mounted, wherein capacitance between patterns provided in the multi-layer circuit substrate across an insulating layer is used as the signal transfer capacitor.

Also, with the isolated switching power supply apparatus, the power transformer preferably further includes a tertiary winding arranged to change the reset voltage of the power transformer based on the timing signal, and a quaternary winding arranged to detect change in the reset voltage of the power transformer, wherein the power transformer also functions as the timing signal transfer circuit. The isolated switching power supply apparatus preferably further includes, at the secondary side, an active clamp circuit defined by the tertiary winding, a capacitor and a switch device, wherein the switch device is turned off with the timing signal.

Also, with the isolated switching power supply apparatus, the timing signal output circuit compares, either directly or indirectly with a comparator, the controlled variable and the target value thereof, (after the start of a period wherein the timing signal can be output), and output, as a timing signal, the timing at which the magnitude relation of two inputs of the comparator switches over and the output switches over. Further, in the event that conditions to output the timing signal (at the time of starting a period in which the timing signal can be output) are satisfied, the timing signal output circuit immediately outputs the timing signal. Moreover, the isolated switching power supply apparatus preferably further includes a ramp voltage superimposing circuit arranged to superimpose, on one of the controlled variable and the target value, ramp voltage synchronous with the switching of the power switch, either directly or indirectly. Also, the isolated switching power supply apparatus preferably further includes an output choke coil at the secondary side, wherein the ramp voltage is generated using an integrated waveform of the output choke coil. Further, the isolated switching power supply apparatus preferably further includes a static deviation reduction circuit arranged to reduce static deviation of the controlled variable and the target value by responding to disturbance more moderately than with the timing signal output circuit.

With preferred embodiments of the present invention, an automatic control circuit of an isolated type is configured without using a photocoupler, so problems inherent to photocouplers are avoided, and not only are deterioration over time of CRT avoided, but the operating ambient temperature of the isolated switching power supply apparatus is set to a wide range. Also, disturbances are responded to by pulse-by-pulse operations, so excellent transient responsivity is achieved.

Also, the control circuit arranged to control the power switch is provided on the primary side, such that a secondary startup power supply circuit of a separate system is not required as the power transformer. Also, the secondary side only sends timing signals to the primary side, so the signal transfer circuit can be driven at a higher frequency than the switching frequency, enabling simplification of the circuit and reduction in size of components thereof, which is advantageous from the perspective of reduction in the size and the cost of the isolated switching power supply apparatus. Also, the design of a switching power supply apparatus for fixed switching frequencies if facilitated, since there is no change in switching frequency due to the output state. Also, adding a static deviation reduction circuit as required enables reduction of static deviation beyond that of a hysteresis control switching power supply apparatus, and excellent output voltage precision is achieved with switching power supply apparatus for constant voltage output.

Further, with preferred embodiments of the present invention, properties are achieved in which reverse electric current is suppressed without providing a reverse current suppression circuit of a synchronous rectifier, which is advantageous in reducing the number of components and simplifying the circuit configuration.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 1:
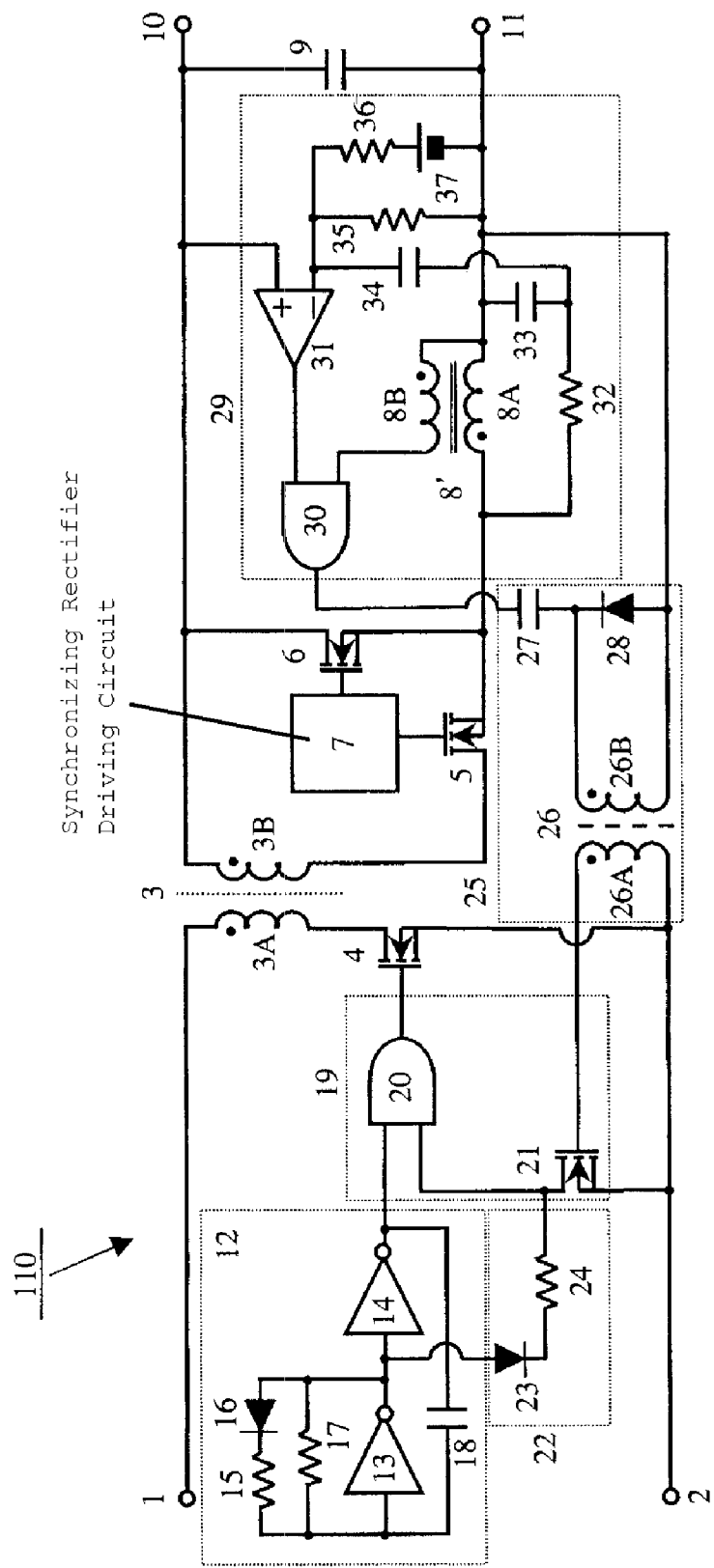
FIG. 1 is a circuit diagram of a preferred embodiment of an isolated switching power supply apparatus according to the present invention.
Figure 10:
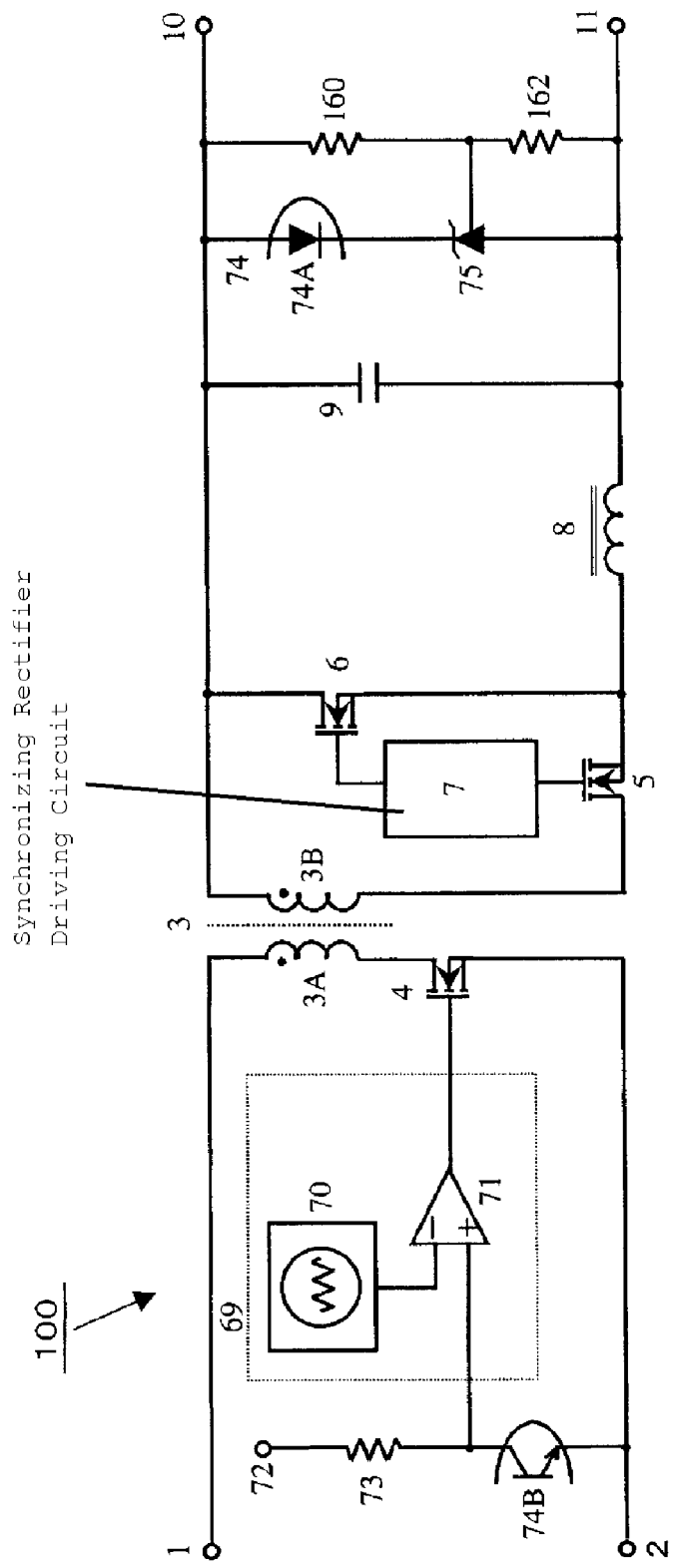
FIG. 10 is a circuit diagram illustrating an example of a conventional isolated switching power supply apparatus.
Figure 11:
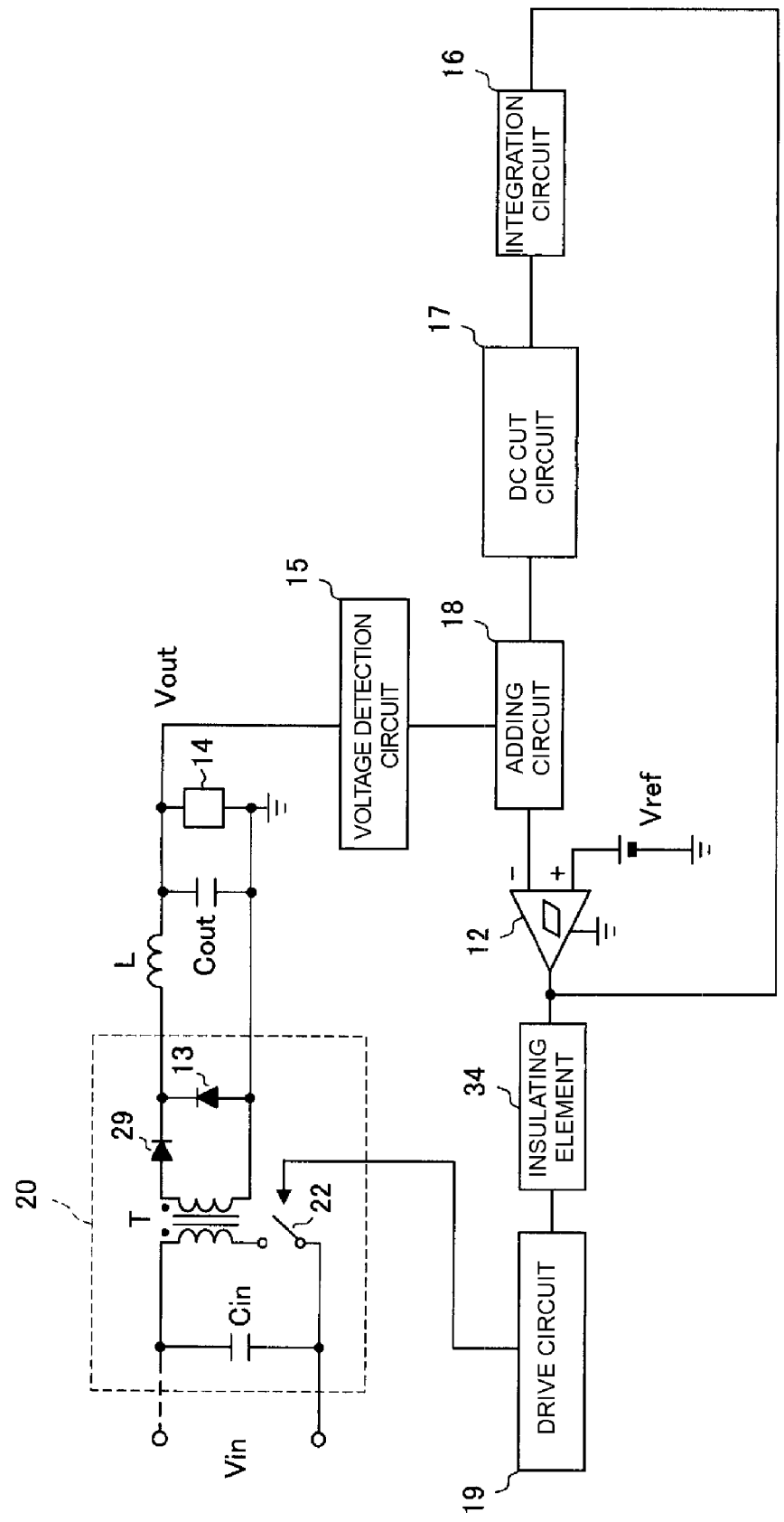
FIG. 11 is a circuit diagram illustrating another example of a conventional isolated switching power supply apparatus.
Figure 12:
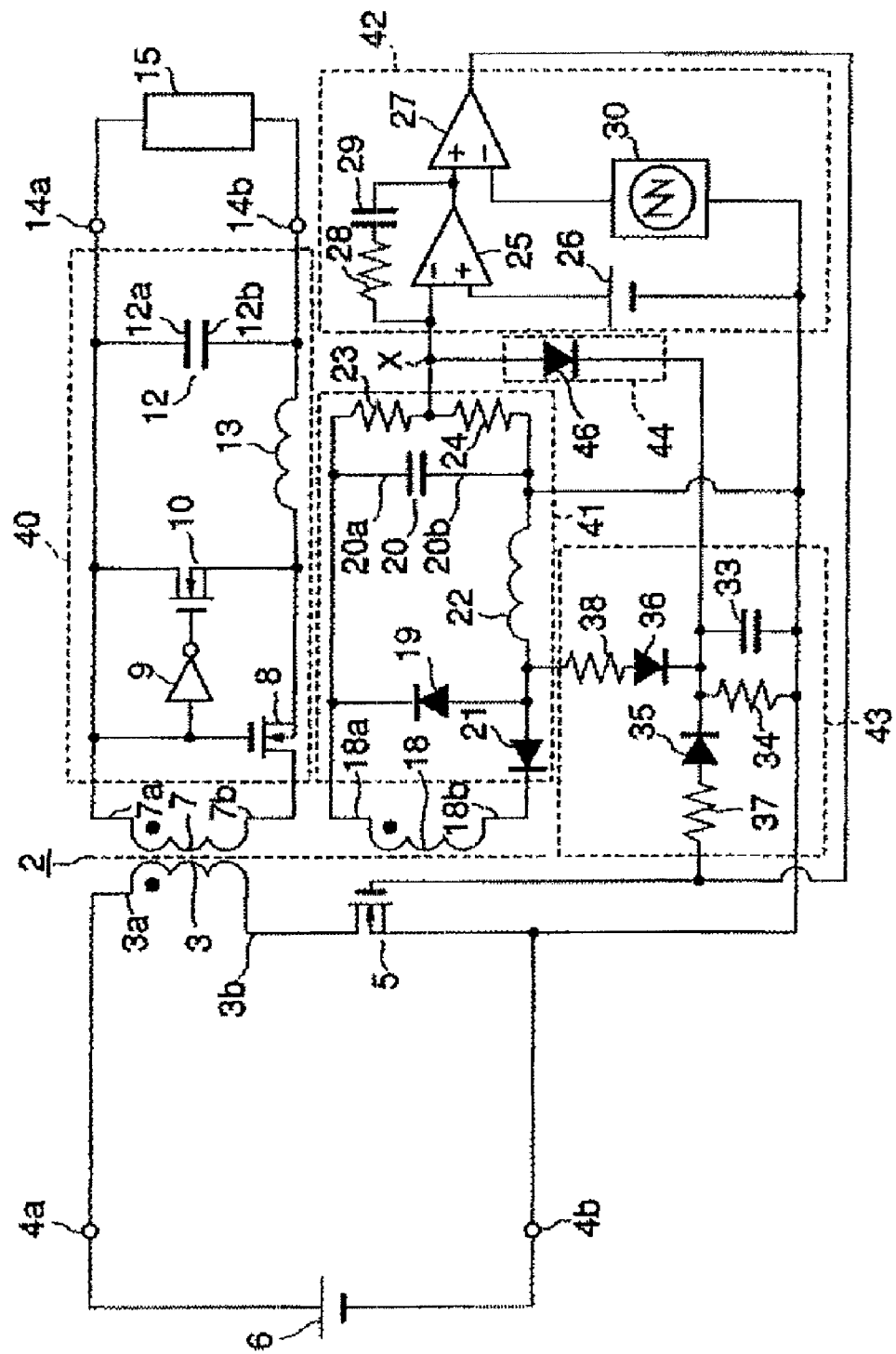
FIG. 12 is a circuit diagram illustrating yet another example of a conventional isolated switching power supply apparatus.

FIG. 1 illustrates a circuit diagram of a first embodiment of the isolated switching power device of the present invention. An isolated switching power device 110 illustrated in FIG. 1 is a single transistor type resonance reset forward converter. In FIG. 1, the same or equivalent portions as those in FIG. 10 are denoted with the same reference numerals.

With the isolated switching power device 110 illustrated in FIG. 1, a power transmission transformer 3 includes a primary winding 3A and a secondary winding 3B. One end of the primary winding 3A is connected to a positive-side input terminal 1, and the other end is connected to a negative-side input terminal 2 via a power switch 4 defined by an N-channel MOSFET.

An oscillation circuit 12 is provided at the primary side of the power transmission transformer 3, and the output thereof is connected to one input of an AND gate 20, and the output of the AND gate 20 is connected to the gate of the power switch 4. A switch device 21 made up of an N-channel MOSFET is connected to between the other input of the AND gate 20 and the negative-side input terminal 2. A power-switch-off circuit 19 defining a power switch control circuit includes the AND gate 20 and the switch device 21. Further, a primary winding 26A of a signal transmission transformer 26 is connected to between the gate and source of the switch device 21.

The oscillation circuit 12 is an stable multi-vibrator including inverters 13 and 14, resistors 15 and 17, a diode 16, and a capacitor 18. The output of the oscillation circuit 12 provides a substantially steady frequency signal, but the H level period thereof is wider than the L level period thereof due to the functions of the resistor 15 and diode 16. This signal drives the power switch 4 via the AND gate 20. During the L level period of the output of the oscillation circuit 12, the L level thereof is not adversely effected by the states of the output and another input of the AND gate 20, which becomes a mask period in which the power switch 4 is always turned off. The off-period of the power switch 4 is never shorter than the L level period of the output of the oscillation circuit 12, so the output of the oscillation circuit 12 provides a signal for determining the maximum on-duty of the power switch 4 (maximum-duty signal).

The signal at the input side of the inverter 14 of the final output stage of the oscillation circuit 12 turns into an inverted signal as to the output of the oscillation circuit 12, but between this point and the drain of the switch device 21 is connected with the diode 23 and the resistor 24 in series. The diode 23 and the resistor 24 define a multiple driving prevention circuit 22. The functions of the multiple driving prevention circuit 22 will be described later.

One end of the secondary winding 3B of the power transmission transformer 3 is connected to a positive-side output terminal 10, and the other end is connected to a negative-side output terminal 11 via a rectification-side synchronizing rectifier 5 and a choke transformer 8' in that order. Between the positive-side output terminal 10 and the negative-side output terminal 11, a smoothing capacitor 9 is connected. Between the connection point of the rectification-side synchronizing rectifier 5 and the primary winding 8A of the choke transformer 8', one end of the secondary winding 3B is connected with a commutation-side synchronizing rectifier 6. The gates of the rectification-side synchronizing rectifier 5 and the commutation-side synchronizing rectifier 6 are connected to a synchronizing rectifier driving circuit 7.

A comparator 31 is provided at the secondary side of the power transmission transformer 3, and the non-inverting input terminal thereof is connected to the positive-side output terminal 10. Also, a reference voltage source 37 arranged to generate a predetermined reference voltage with respect to the negative-side output terminal 11 is provided at the secondary side of the power transmission transformer 3, and voltage dividing points at which the output thereof is voltage-divided by the resistor 36 and the resistor 35 are connected to the inverting input terminal of the comparator 31. Further, a series circuit including a resistor 32 and a capacitor 33 is connected in parallel to the primary winding 8A of the choke transformer 8', and the connection point thereof is also connected to the inverting input terminal of the comparator 31 via a capacitor 34.

The output of the comparator 31 is connected to one input of the AND gate 30. One end of the secondary winding 8B of the choke transformer 8' is connected to the negative-side output terminal 11, and the other end thereof is connected to the other input of the AND gate 30. The output of the AND gate 30 is connected to the negative-side output terminal 11 via a capacitor 27 and a secondary winding 26B of a signal transmission transformer 26. Both ends of the secondary winding 26B are connected with a diode 28.

The comparator 31, reference voltage source 37, resistor 35, resistor 36, choke transformer 8', resistor 32, capacitor 33, and AND gate 30 define an on-period control circuit 29 functioning as a timing signal output circuit. Also, the capacitor 27, diode 28, and signal transmission transformer 26 define an isolating signal transmission circuit 25 functioning as a timing signal transmission circuit.

The operations of the isolated switching power device 110 will be described with reference to the operational waveforms illustrated in FIG. 2. First, a normal switching operation will be described based on the operational waveforms of approximately two cycles prior to the point B in FIG. 2, for example.

First, when the output of the oscillation circuit 12 is at an L level, the output of the AND gate whose one input is applied therewith is at the L level regardless of the state of another input thereof, whereby the power switch 4 is turned off. The gate of the switch device 21 is in a ground level via the primary winding 26A of the signal transmission transformer 26, whereby the switch device 21 is turned off. Also, the input side of the inverter 14 in the oscillation circuit 12 is at an H level, so that an electric current flows via the diode 23 and resistor 24, and the parasitic capacitance between the drain and source of the switch device 21 in an off state is charged, and accordingly, the drain of the switch device 21, i.e., the other input of the AND gate 20, goes to the H level.

In this state, when the output of the oscillation circuit 12 going to the H level, the output of the AND gate also goes to the H level, the power switch 4 is turned on, an electric current begins to flow to the primary winding 3A of the power transmission transformer 3. Simultaneously, the rectification-side synchronizing rectifier 5 is turned on by the synchronizing rectifier driving circuit 7, the commutation-side synchronizing rectifier 6 is turned off, and an electric current also begins to flow to the secondary winding 3B via the primary winding 8A of the choke transformer 8' and the rectification-side synchronizing rectifier 5. Thus, the timing at which the power switch 4 is turned on depends on the rising timing of the output of the oscillation circuit 12 at the primary side. In other words, the timing at which the power switch 4 is turned on is controlled at the primary side.

An output voltage functioning as the amount of control (the voltage of the positive-side output terminal 10) is input directly to the non-inverting input terminal of the comparator 31, the voltage at which the reference voltage source 37 functioning as a target value is voltage-divided by the resistors 35 and 36 and is input to the inverting input terminal thereof, whereby the amount of control and the target value are indirectly compared. The voltage at both ends of the primary winding 8A of the choke transformer 8' is integrated with the resistor 32 and capacitor 33, and the ramp voltage at which the DC portions are cut by the capacitor 34 is applied to the connection point between the resistors 35 and 36, thereby superimposing the divided voltage of the reference voltage source 37 with the ramp voltage. In other words, the reference voltage source functioning as a target value is superimposed indirectly with the ramp voltage using the voltage-divided resistance. Further, the output voltage functioning as the amount of control is also superimposed with a ripple voltage, which acts in a direction that strengthens the inclination of the ramp voltage.

The output of the comparator 31 is applied to one input of the AND gate 30. The period in which the output of the secondary winding 8B of the choke transformer 8' connected to the other input of the AND gate 30 is at the H level substantially matches the on period of the power switch 4. That is to say, the output of the secondary winding 8B can be used to detect a power-switch on period. Therefore, the output of the comparator 31 is output via the AND gate 30 only during the on period of the power switch 4.

When the voltage of the inverting input terminal of the comparator 31, in a state in which the power switch 4 is turned on, falls below the output voltage, the output of the comparator 31 goes to the H level, and the output of the AND gate 30 goes to the H level. With the output of the AND gate 30, the DC portions are cut by the capacitor 27, and only the signal corresponding to the level change from the L level to the H level is transferred from the secondary winding 26B of the signal transmission transformer 26 to the primary winding 26A thereof in an isolated manner as an off signal for turning off the power switch 4. The off signal is consequently output with the change of the output of the comparator 31 from the H level to the H level as a trigger.

Note that the diode 28 includes a function for resetting the core of the signal transmission transformer 26 magnetized at the time of transferring an off signal. Also, an arrangement may be provided in which the signal transmission transformer 26 is defined by a compound magnetic component sharing the same core as the power transmission transformer 3 or choke transformer 8', thereby reducing the size and cost of the components. A method for forming such a compound magnetic component is disclosed in Japanese Unexamined Patent Application Publication No. 2000-260639, for example.

The off signal output from the primary winding 26A of the signal transmission transformer 26 is applied to the gate of the switch device 21, and the switch device 21 is turned on for only a short period of time. While the switch device 21 is on, the charge accumulated in the parasitic capacitance thereof is discharged, and the other input of the AND gate 20 goes to the L level. Thus, the output of the AND gate 20 goes to the L level, and the power switch 4 is turned on. Thus, the turn-off of the power switch 4 is controlled by the off signal transferred from the secondary side to the primary side via the signal transmission transformer 26. In other words, the timing of turn-off of the power switch 4 is controlled from the secondary side. Accordingly, this off signal provides a timing signal at the isolated switching power device 110.

During a period in which the output of the oscillation circuit 12 is at the H level the input side of the inverter 14 is at the H level, so no electric current flows via the diode 23 and the resistor 24. Accordingly, even if the switch device 21 is turned off again following the power switch 4 being turned off, no parasitic capacitance between the drain and source is charged, and the other input of the AND gate 20 is maintained at the L level. Therefore, during the period in which the output of the oscillation circuit 12 is at the H level, even if the off signal is received again via the signal transmission transformer 26, the power switch 4 that is turned off once does not repeat turn-off and turn-on. That is to say, this circuit including the diode 23 and the resistor 24 prevents a situation in which a power switch driving signal is generated twice in one cycle to provide an unstable control operation from occurring by restricting the off signal to be received only once in one cycle of the oscillation circuit 12. Therefore, this circuit is referred to as a multiple driving prevention circuit 22.

Upon the power switch 4 being turned off, the voltage of the inverting input terminal of the comparator 31 rises, and if this exceeds the output voltage, the output of the comparator 31 goes to the L level, and the output of the AND gate 30 is also returned to the L level. However, this level change is not transferred to the primary side.

Also, upon the power switch 4 being turned off, a resonant current between the parasitic capacitance of the power switch 4 and the primary winding 3A of the power transmission transformer 3 temporarily flows to the primary winding 3A of the power transmission transformer 3, and subsequently, no current flows thereto. Simultaneously, the rectification-side synchronizing rectifier 5 is turned off by the synchronizing rectifier driving circuit 7, the commutation-side synchronizing rectifier 6 is turned on, and a commutating current flows via the primary winding 8A of the choke transformer 8' and the commutation-side synchronizing rectifier 6. This condition continues until the power switch 4 is turned on by the output of the oscillation circuit 12 going to the H level.

With the isolated switching power device 110, the switching operation of the power switch 4 is thus repeated with the oscillating frequency of the oscillation circuit 12 at the time of a normal operation.

Note that the oscillating frequency of the oscillation circuit 12 is determined by a multi-vibrator constant, so the isolated switching power device 110 is operated with a substantially fixed switching frequency. The state of the output of the isolated switching power does not affect the oscillation circuit 12. Therefore, no fluctuation of the switching frequency due to the output state occurs, thereby facilitating the design of the isolated switching power.

Also, the off signal (timing signal) transferred from the secondary side to the primary side is a signal which is information including only the fluctuation of the output of the AND gate, and the frequency of this signal is higher than the switching frequency. Therefore, similar to the signal transmission transformer 26, the size and cost thereof is reduced.

Next, description will be provided for when the output voltage is suddenly changed. FIG. 2 illustrates a situation in which on and after the point A, following the output voltage being deteriorated suddenly due to the sudden deterioration of the input voltage or the sudden increase of the load current, the output voltage is restored to a default value by the PWM control operation of the power switch.

First, the power switch 4 is turned on at the timing at which the output of the oscillation circuit 12 goes to the H level. At this time, the other input of the AND gate 20 is at the H level as described above, but when the output voltage is so low that the voltage of the non-inverting input terminal of the comparator 31 cannot exceed the voltage of the inverting input terminal, no off signal occurs at the secondary side, so the other input of the AND gate 20 is maintained at the H level. Upon the output of the oscillation circuit 12 going to the L level in due course, the output of the AND gate 20 goes to the L level, and the power switch 4 is turned off. In this case, the power switch 4 is subjected to switching only by the output of the oscillation circuit 12, which is the switching with the maximum on-duty.

Upon the output voltage being increased by the switching with the maximum on-duty, the voltage of the non-inverting input terminal of the comparator 31 exceeds the voltage of the inverting input terminal, and the turn-off of the power switch 4 is controlled by the off signal from the secondary side. In FIG. 2, the switching with the maximum on-duty on and after the point A is only one cycle.

Figure 2:
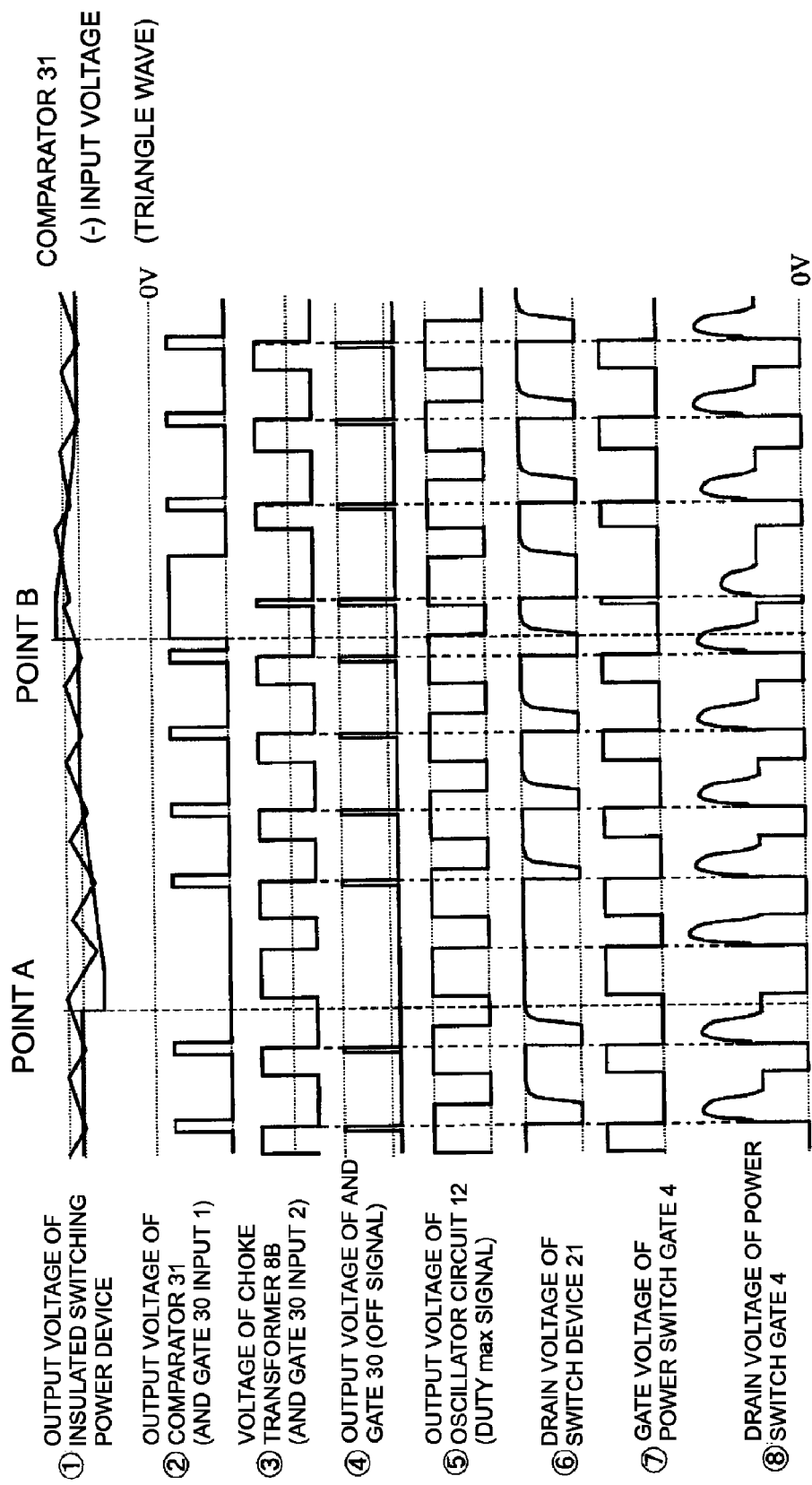
FIG. 2 is a waveform diagram illustrating operating waveforms of the various components of the isolated switching power supply apparatus shown in FIG. 1.

Also, FIG. 2 illustrates a situation in which on and after the point B, following the output voltage being increased suddenly due to the sudden increase of the input voltage or the sudden decrease of the load current, the output voltage is restored to a default value by the PWM control operation of the power switch.

When the output voltage is so high that the voltage of the non-inverting input terminal of the comparator 31 exceeds the voltage of the inverting input terminal, the output of the comparator 31 goes to the H level even during the off period of the power switch 4. However, during the off period of the power switch 4 the output of the secondary winding 8B of the choke transformer 8' to be input to the AND gate 30 is at the L level, so the output of the AND gate 30 is at the H level.

Even in this state, the power switch 4 is turned on at the timing at which the output of the oscillation circuit 12 goes to the H level. Thus, the output of the secondary winding 8B of the choke transformer 8' goes to the H level, both of the two inputs of the AND gate 30 go to the H level, so the output of the AND gate 30 is changed from the L level to the H level, the off signal is output, and is propagated to the primary side via the signal transmission transformer 26, and the power switch 4 is immediately turned off. The off signal in this case is different from that which occurs during the normal operation, and is output with the fluctuation of the output of the secondary winding 8B of the choke transformer 8' generated by the power switch 4 being turned on as a trigger. Accordingly, the on period of the power switch 4 is shortened to the minimum on-duty. Thus, with the isolated switching power device 110, the power switch 4 is always turned on with the minimum on-duty even when the output voltage is high.

As described above, the control circuit of the isolated switching power device 110 performs a pulse-by-pulse operation to control the on-duty ratio in response to the sudden fluctuation of the output voltage, as shown in the point A and point B in FIG. 2 at the immediately following cycle, which improves in transient responsivity.

Note that with the conventional PWM control, upon the on-duty ratio of the power switch being finely controlled to a minimal level, the pulse width of the power switch driving signal becomes zero, and consequently, a switching cycle occurs in which there is no power switch driving signal. However, the isolated switching power device 110 according to this preferred embodiment of the present invention produces no operational mode in which the pulse width of the power switch driving signal becomes zero as described above.

Preventing the pulse width of the power switch driving signal from becoming zero enables an advantage of suppressing the inverted electric current of the synchronizing rectifier to be provided. Description will be made regarding this point.

With the switching power supply including a synchronizing rectifier, such as the conventional example 3, an isolated switching power supply, an output smoothing capacitor, and other suitable components, which are connected in parallel, define an inverted electric current source, and an operational mode is provided in which an inverted electric current flows from the output side to the input side. During the switching operation of the isolated switching power supply, when a voltage is higher than the output voltage being applied by the inverted electric current source, an inverted electric current flows from the output side to the input side. When an inverted electric current increases to a critical point at which an inverted electric current flows to the output choke coil over the entire cycle, a period occurs in which a power switch drain voltage is maintained at approximately 0 V even after the power switch driving signal is turned off. This is because the on-duty ratio of the power switch driving signal is reduced to suppress the increase of the output voltage due to the operation of the inverted electric current source, but when an inverted electric current flows to the parasitic diode of the MOSFET defining a power switch after the power switch driving signal is turned off, the power switch drain voltage is prevented from increasing during the period thereof.

Upon attempting to further increase an inverted electric current, the pulse width of the power switch driving signal is reduced, and both of the power switch driving signal and the power switch drain voltage increase in the L level period thereof. When using the conventional PWM control, and also providing no inverted electric current prevention circuit such as the conventional example 3, the pulse width is reduced to zero, and the synchronizing rectifier falls into self-oscillation.

Figure 13A:
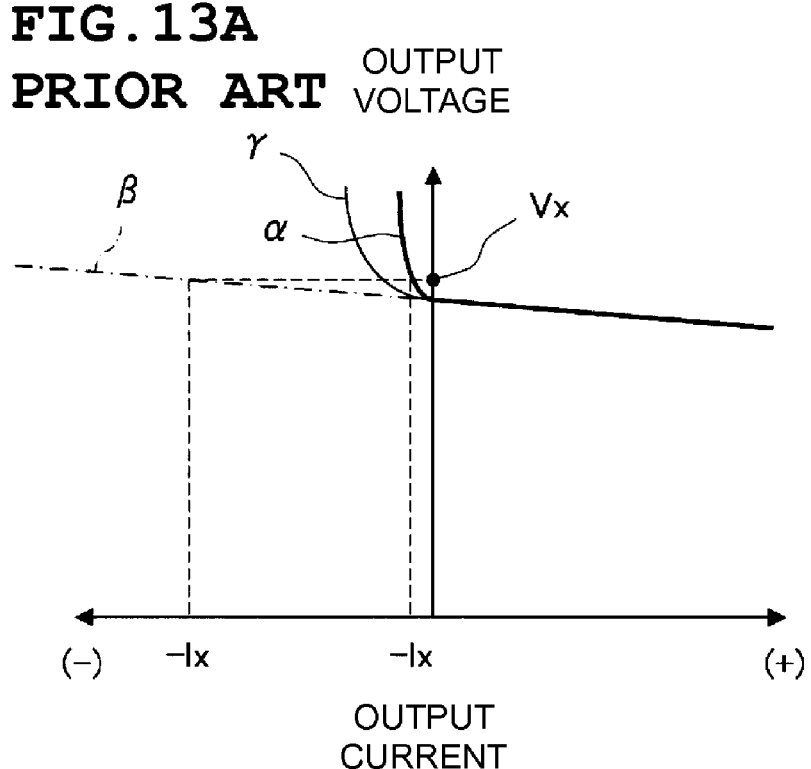
FIGS. 13A and 13B are property diagrams illustrating static regulation properties with the isolated switching power supply apparatus shown in FIG. 12.
Figure 13B:
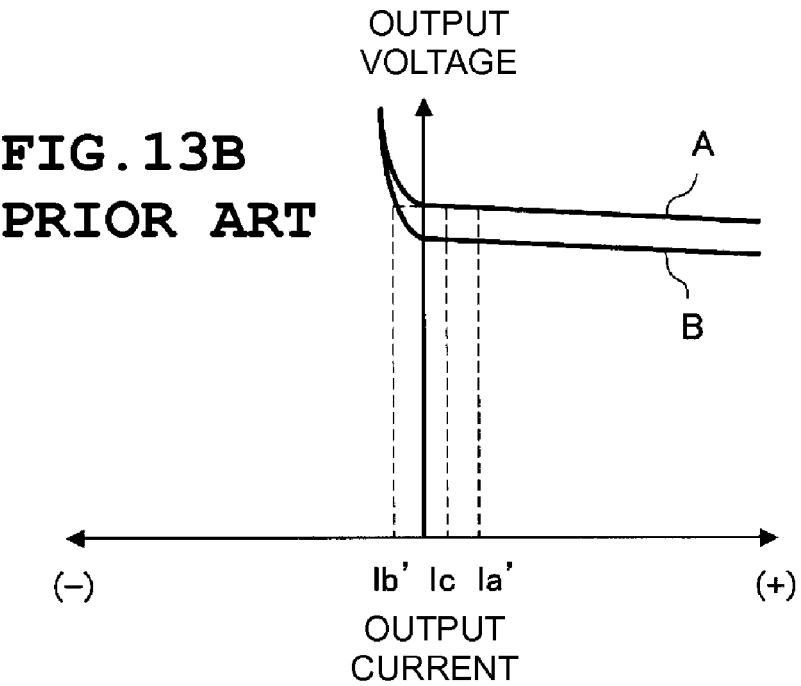

With the circuit according to the first preferred embodiment, the pulse width of the power switch driving signal does not become zero, and instead, becomes the minimum pulse width as to an inverted electric current which is not less than a steady value. With this operational mode, if the inverted electric current source does not cause the voltage applied to the output to increase further, the static regulation properties similar to FIGS. 13A and 13B wherein an inverted electric current does not increase are obtained, and consequently, the inverted electric current is suppressed. Thus, the circuit according to the first preferred embodiment includes properties capable of suppressing an inverted electric current even if no inverted electric current prevention circuit is provided.

Also, with the isolated switching power device 110 according to this preferred embodiment of the present invention, in the event that no off signal is transferred from the secondary side, such as on and after the point A in FIG. 2, switching of the power switch 4 can be performed only by the circuits at the primary side. Note that at the time of starting activation, the off signal is supplied from a soft start circuit (not shown) separately provided at the primary side, instead of from the circuit at the secondary side to gradually expand the ratio when the power switch is on. Thus, it is not necessary for the circuits at the secondary side to function. Therefore, there is no need to provide a secondary activation power supply circuit, which is advantageous for reducing the size and cost.

Second Preferred Embodiment

Figure 3:
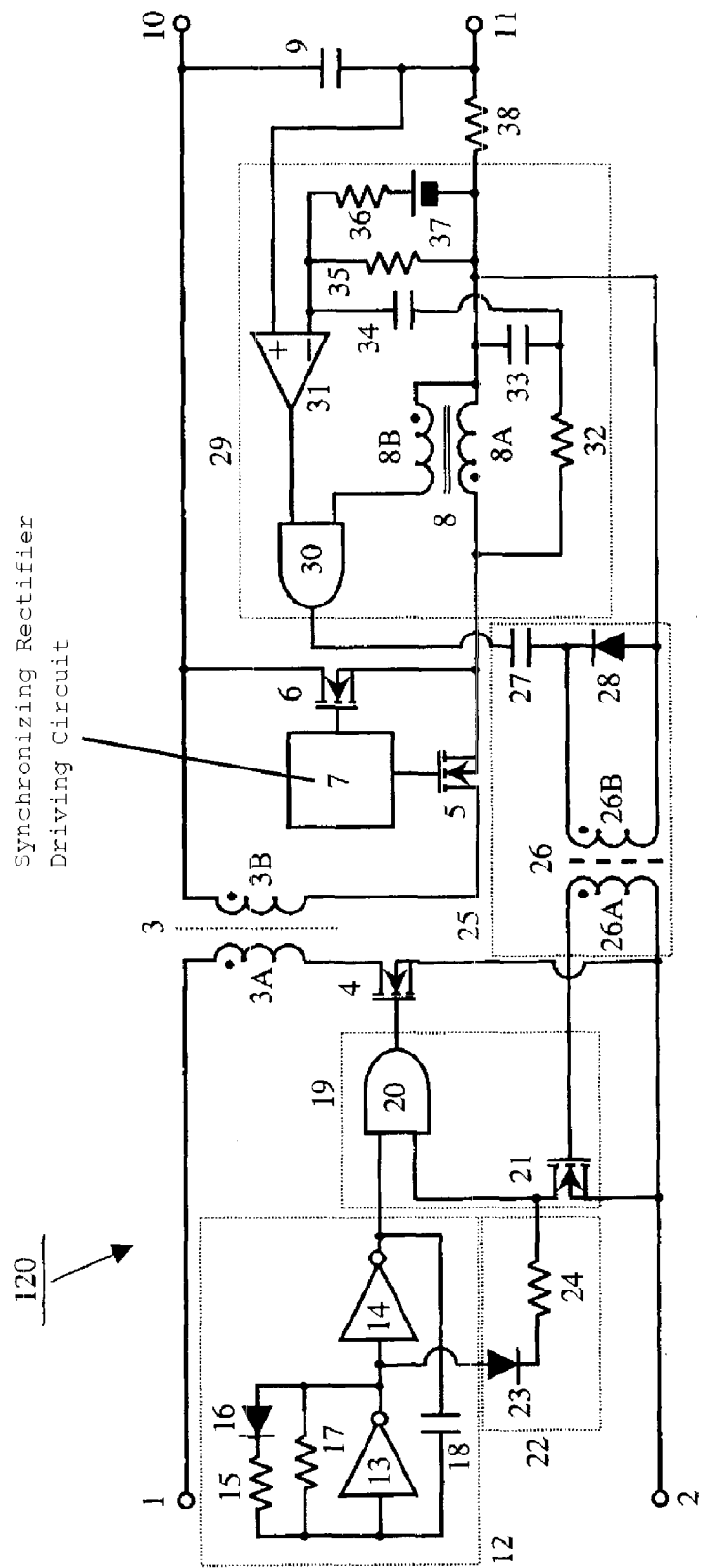
FIG. 3 is a circuit diagram of another preferred embodiment of the isolated switching power supply apparatus according to the present invention.

FIG. 3 illustrates a circuit diagram of a second preferred embodiment of the isolated switching power device according to the present invention. The isolated switching power device 120 illustrated in FIG. 3 is also a single transistor type resonance reset forward converter. In FIG. 3, the same or equivalent portions as those in FIG. 1 are denoted with the same reference numerals, and the description thereof will be omitted.

The isolated switching power device 120 illustrated in FIG. 3 is different from the isolated switching power device 110 illustrated in FIG. 1 only in that an arrangement is provided in which a resistor 38 is provided serially to the negative-side electric current route, one end of the resistor 38 (the negative-side output terminal 11 side) is connected to the non-inverting input terminal of the comparator 31, and the other end thereof is connected with the reference voltage source 37. Thus, the output electric current is converted into voltage at the resistor 38, which is compared to the reference voltage source 37 which is a target value functioning as the amount of control, thereby stabilizing the output electric current.

The isolated switching power device according to the second preferred embodiment has the same circuit configuration as that in the first preferred embodiment except that the amount of control is an output electric current, and the circuit operations are also substantially the same as those in the first preferred embodiment. Accordingly, the detailed description thereof will be omitted.

The control circuit according to the second preferred embodiment also performs pulse-by-pulse operations, as with the first preferred embodiment, and accordingly, provides excellent transient responsivity, and has an advantage in that the fluctuation of the output electric current is suppressed even if there is sudden fluctuation in the input voltage or output voltage.

Third Preferred Embodiment

Figure 4:
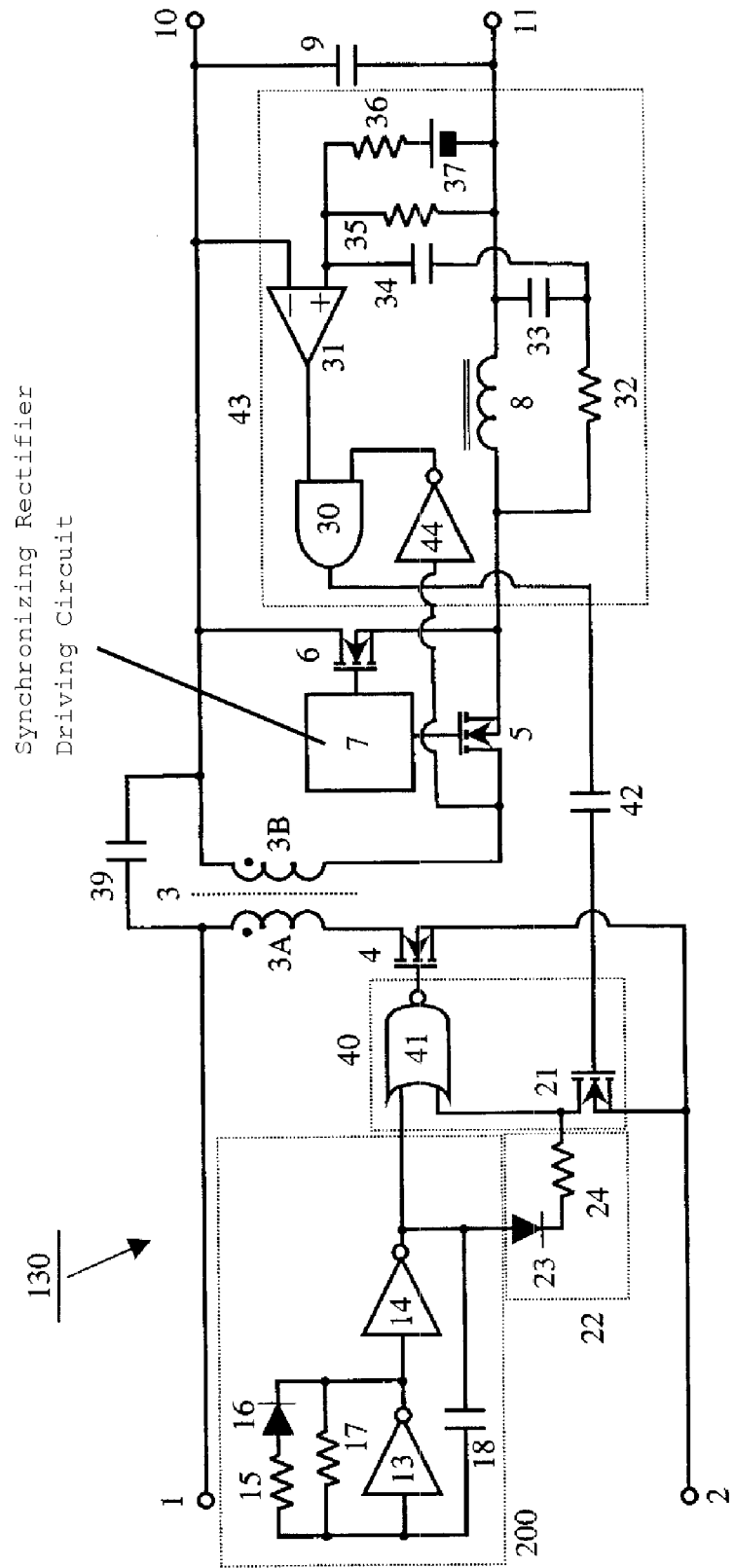
FIG. 4 is a circuit diagram of yet another preferred embodiment of the isolated switching power supply apparatus according to the present invention.

FIG. 4 illustrates a circuit diagram of a third preferred embodiment of the isolated switching power device according to the present invention. The isolated switching power device 130 illustrated in FIG. 4 is also a single transistor type resonance reset forward converter. In FIG. 4, the same or equivalent portions as those in FIG. 1 or FIG. 10 are denoted with the same reference numerals, and description thereof will be omitted.

With the isolated switching power device 130 illustrated in FIG. 4, an oscillation circuit 200 is provided at the primary side, and the output thereof is connected to one input of a NOR gate 41, and the output of the NOR gate 41 is connected to the gate of the power switch 4. The switch device 21 including an N-channel MOSFET is connected between the other input of the NOR gate 41 and the negative-side input terminal 2. The NOR gate 41 and the switch device 21 is a power switch on circuit 40 defining a power switch control circuit.

The oscillation circuit 200 is the same as the oscillation circuit 12 in FIG. 1, except that the diode 16 faces in a reverse direction. With the output of the oscillation circuit 200, the H level period is set so as to be narrower than the L level period (on-duty becomes small) by the resistor 15 and the diode 16 facing is a reverse direction. The H level period of output of the oscillation circuit 200 is set so as to be shorter than the reset period of the power transmission transformer 3. This output drives the power switch 4 via the NOR gate 41. During the H level period of output of the oscillation circuit 200, the output of the NOR gate 41 is at the L level, so the power switch 4 is always turned off.

Between the output of the oscillation circuit 200 and the drain of the switch device 21, the multiple driving prevention circuit 22 including the diode 23 and resistor 24 is connected. The function of the multiple driving prevention circuit 22 is basically the same as that in the isolated switching power device 110 illustrated in FIG. 1.

One end of the secondary winding 3B of the power transmission transformer 3 is connected to the positive-side output terminal 10, and the other end thereof is connected to the negative-side output terminal 11 via the rectification-side synchronizing rectifier 5 and the choke coil 8 in that order. Between the positive-side output terminal 10 and the negative-side output terminal 11, the smoothing capacitor 9 is connected. Between the connection point of the rectification-side synchronizing rectifier 5 and the choke coil 8, one end of the secondary winding 3B is connected with the commutation-side synchronizing rectifier 6. The gates of the rectification-side synchronizing rectifier 5 and the commutation-side synchronizing rectifier 6 are connected to the synchronizing rectifier driving circuit 7.

The comparator 31 is provided at the secondary side of the power transmission transformer 3, and the non-inverting input terminal thereof is connected to the positive-side output terminal 10. Also, the reference voltage source 37 for generating a predetermined reference voltage as to the negative-side output terminal 11 is provided at the secondary side, and voltage dividing points wherein the output thereof is voltage-divided by the resistor 36 and resistor 35 are connected to the non-inverting input terminal of the comparator 31. Further, a series circuit including the resistor 32 and the capacitor 33 is connected to the choke coil 8 in parallel, and the connection point thereof is also connected to the connection point of the resistor 36 and resistor 35 via the capacitor 34.

The output of the comparator 31 is connected to one input of the AND gate 30. The output of an inverter 44 is connected to the other input of the AND gate 30, and the input of the inverter 44 is connected to the other end of the secondary winding 3B. The output of the AND gate 30 is connected to the gate of the switch device 21 via the signal transfer capacitor 42 defining a timing signal transmission circuit.

The comparator 31, reference voltage source 37, resistor 35, resistor 36, choke coil 8, resistor 32, capacitor 33, AND gate 30, and inverter 44 define an off-period control circuit 43 defining a timing signal output circuit.

Further, between one end of the primary winding 3A of the power transmission transformer 3 and one end of the secondary winding 3B, a capacitor 39 for removing common mode noise is connected.

The operations of the isolated switching power device 130 will be described with reference to the operational waveforms illustrated in FIG. 5. First, a normal switching operation will be described based on the operational waveforms of around two cycles forward from the point A in FIG. 5, for example.

First, when the output of the oscillation circuit 200 is at the H level, the output of the NOR gate 41 whose one input is applied therewith is at the L level, so the power switch 4 is turned off. At this time, an electric current flows via the diode 23 and the resistor 24, and the parasitic capacitance between the drain and source of the switch device 21 in an off state is charged, and accordingly, the drain of the switch device 21, i.e., the other input of the NOR gate 41 goes to the H level.

Even if the output of the oscillation circuit 200 is changed from the H level to the L level following a short on period, so the other input of the NOR gate 41 keeps the H level at that timing, the output of the NOR gate 41 is still at the L level, and the power switch 4 is still off.

An output voltage functioning as the amount of control is input to the inverting input terminal of the comparator 31 directly, the voltage at which the reference voltage source 37 functioning as a target value is voltage-divided by the resistors 35 and 36 is input to the non-inverting input terminal thereof, whereby the amount of control and the target value are indirectly compared. Also, the voltage at both ends of the choke coil 8 is integrated with the resistor 32 and capacitor 33, and the ramp voltage at which the DC portions are cut by the capacitor 34 is superimposed on the connection point between the resistors 35 and 36, thereby superimposing the divided voltage of the reference voltage source 37 with the ramp voltage. In other words, the reference voltage source functioning as a target value is superimposed indirectly with the ramp voltage using the voltage-divided resistance. Further, the output voltage functioning as the amount of control is also superimposed with a ripple voltage, which acts in a direction which strengthens the inclination of the ramp voltage.

The output of the comparator 31 is applied to one input of the AND gate 30. The output of the inverter 44 to be input to the other input of the AND gate 30 is at the H level during a period other than the reset period of the power transmission transformer 3. In other words, the reset period of the power transmission transformer 3 can be detected with the output of the inverter 44. Therefore, the output of the comparator 31 is output via the AND gate 30, except for the reset period of the power transmission transformer 3.

When the voltage of the non-inverting input terminal of the comparator 31 increases and exceeds the output voltage in a state in which the power switch 4 is off, and the output of the oscillation circuit 200 is in a L level, the output of the comparator 31 goes to the H level, and the output of the AND gate 30 goes to the H level. The output of the AND gate 30 whose DC portions are cut by a signal transfer capacitor 42, and whose signal alone in response to the level change from the L level to the H level is output as an on signal (timing signal) for turning on the power switch 4. The on signal in this case is output with the change of output of the comparator 31 from the L level to the H level as a trigger.

The on signal is applied to the gate of the switch device 21, and the switch device 21 is turned on only for a short period of time. Upon the switch device 21 being turned on, the charge accumulated in the parasitic capacitance thereof is discharged, and the other input of the NOR gate 41 goes to the L level. Thus, the output of the NOR gate 41 goes to the H level, and the power switch 4 is turned on. Thus, the turn-on of the power switch 4 is controlled by the on signal transferred from the secondary side to the primary side. In other words, the timing of turn-on of the power switch 4 is controlled from the secondary side. Accordingly, this on signal becomes a timing signal at the isolated switching power device 120.

During a period in which the output of the oscillation circuit 200 is at the L level, no electric current flows via the diode 23 and the resistor 24, so even if the switch device 21 is turned off again, no parasitic capacitance between the drain and source is charged, and the other input of the NOR gate 41 is maintained at the L level. Therefore, during the period in which the output of the oscillation circuit 200 is at the L level, even if the on signal is received again, the operation of the power switch 4 is not affected thereby. That is to say, this circuit including the diode 23 and the resistor 24 prevents a situation in which a power switch driving signal is generated twice in one cycle, resulting in unstable control operations, from occurring, by restricting the on signal to be received only once at one cycle of the oscillation circuit 200. Therefore, this circuit is referred to as a multiple driving prevention circuit 22.

Upon the power switch 4 being turned on, the voltage of the non-inverting input terminal of the comparator 31 falls, and if this falls below the output voltage, the output of the comparator 31 goes to the L level, and the output of the AND gate 30 is also returned to the L level. However, even if this level change is transferred to the primary side, this signal is ignored since this signal does not become a signal for turning on the switch device 21.

Also, upon the power switch 4 being turned on, an electric current begins to flow to the primary winding 3A of the power transmission transformer 3. Simultaneously, the rectification-side synchronizing rectifier 5 is turned on by the synchronizing rectifier driving circuit 7, the commutation-side synchronizing rectifier 6 is turned off, and the electric current begins to flow via the primary winding 8A of the choke transformer 8' and rectification-side synchronizing rectifier 5.

Subsequently, after a period of time, the output of the oscillation circuit 200 goes to the H level. Thus, the output of the NOR gate 41 goes to the L level, such that the power switch 4 is turned off. Thus, the timing at which the power switch 4 is turned off depends on the rising timing of output of the oscillation circuit 200 at the primary side. In other words, the timing at which the power switch 4 is turned off is controlled at the primary side.

Upon the power switch 4 being turned off, a resonant current between the parasitic capacitance of the power switch 4 and the primary winding 3A of the power transmission transformer 3 flows to the primary winding 3A of the power transmission transformer 3 only during the reset period. As described above, the oscillation circuit 200 is set beforehand such that the H level period is shorter than the reset period. Therefore, during the reset period the output of the oscillation circuit 200 goes to the L level. During this reset period, the output of the inverter 44 goes to the L level, such that the on signal is not output regardless of the output state of the comparator 31.

Also, upon the power switch 4 being turned off, the rectification-side synchronizing rectifier 5 is turned off by the synchronizing rectifier driving circuit 7, the commutation-side synchronizing rectifier 6 is turned on, and a commutation electric current begins to flow via the choke coil 8 and the commutation-side synchronizing rectifier 6. This state continues until the power switch 4 is turned on next by the on signal from the secondary side.

With the isolated switching power device 130, at the time of normal operation, the switching operation of the power switch 4 is repeated with the oscillating frequency of the oscillation circuit 200.

Note that the oscillating frequency of the oscillation circuit 200 is determined by a multi-vibrator constant, so the isolated switching power device 130 is operated with a substantially fixed switching frequency. Therefore, no fluctuation of the switching frequency due to the output state occurs, thereby facilitating the design of the isolated switching power.

Also, the on signal (timing signal) transferred from the secondary side to the primary side is a signal which is information including only the fluctuation of output of the AND gate, and the frequency of this signal is greater than the switching frequency. Therefore, the signal transfer capacitor 42 defining a timing signal transmission circuit can be configured with a small capacitance, thereby reducing the size and cost thereof.

Note that the capacitor 39 is a capacitor for removing common mode noise, but in order to reduce the level of common mode noise mixed in the signal transfer capacitor 42 to prevent malfunction from occurrence, a relation, such as capacitance of signal transfer capacitor 42 << capacitance of capacitor 39, is required.

Note that the capacitance of the signal transfer capacitor 42 can be set to be small, as the on signal is configured so as to have a higher frequency, and if the capacitance of the signal transfer capacitor 42 is set to several MHz, for example, even a capacitance of about 10 pF can be transferred.

Also, when components are mounted on a multilayer substrate to configure a switching power module, a capacitor having a small capacity can be provided using an unused inner pattern, such that the signal transfer capacitor 42 is built into the multilayer substrate, thereby providing an advantage in that the number of components is not increased.

Next, description will be made regarding when the output voltage suddenly changes. FIG. 5 illustrates, on and after the point A, a situation in which the output voltage is restored to a default value by the PWM control operation of the power switch following the output voltage suddenly decreasing due to the sudden decrease of the input voltage, or the sudden increase of the load current.

In the event that the output voltage suddenly decreases at the point A at which the power switch 4 is on, and the voltage of the inverting input terminal of the comparator 31 falls below the voltage of the non-inverting input terminal, the output of the comparator 31 goes to the H level. At this time, the output of the inverter 44 to be input to the AND gate 30 is also at the H level, so the output of the AND gate 30 goes to the H level, and the on signal is propagated to the gate of the switch device 21 via the signal transfer capacitor 42. However, at this time, the power switch 4 is in an on state, and the multiple driving prevention circuit 22 functions to keep the drain voltage of the switch device 21 at the L level, and accordingly, the on signal is ignored.

Subsequently, the output of the oscillation circuit 200 goes to the H level, whereby the power switch 4 is turned off. With the switch device 21, the parasitic capacitance between the drain and source is charged again, the drain goes to the H level, thereby enabling the on signal to be received. The output of the inverter 44 goes to the L level when the reset period of the power transmission transformer 3 begins, following the turn-off of the power switch 4, and the output of the AND gate 30 also goes to the L level.

Subsequently, when the reset period ends, the output of the inverter 44 goes to the H level. On the other hand, the output voltage does not increase during the reset period, so the output of the comparator 31 is maintained at the H level. Therefore, the output of the AND gate 30 is changed from a L level to a H level at the end timing of this reset period again, the on signal is output, and the power switch 4 is turned on. Consequently, the power switch 4 is turned off only during the reset period of the power transmission transformer 3.

Upon the power switch 4 being turned on, the voltage of the non-inverting input terminal of the comparator 31 falls, and upon this voltage falling below the output voltage, the output of the comparator 31 goes to the L level, and the output of the AND gate 30 is also returned to the L level.

This state continues until the power switch 4 is turned off next by the output of the oscillation circuit 200 going to the H level. The on period in this case is a period obtained by subtracting the reset period of the power transmission transformer 3 from the one cycle determined by the oscillation circuit 200, which is the maximum on-duty.

Figure 5:
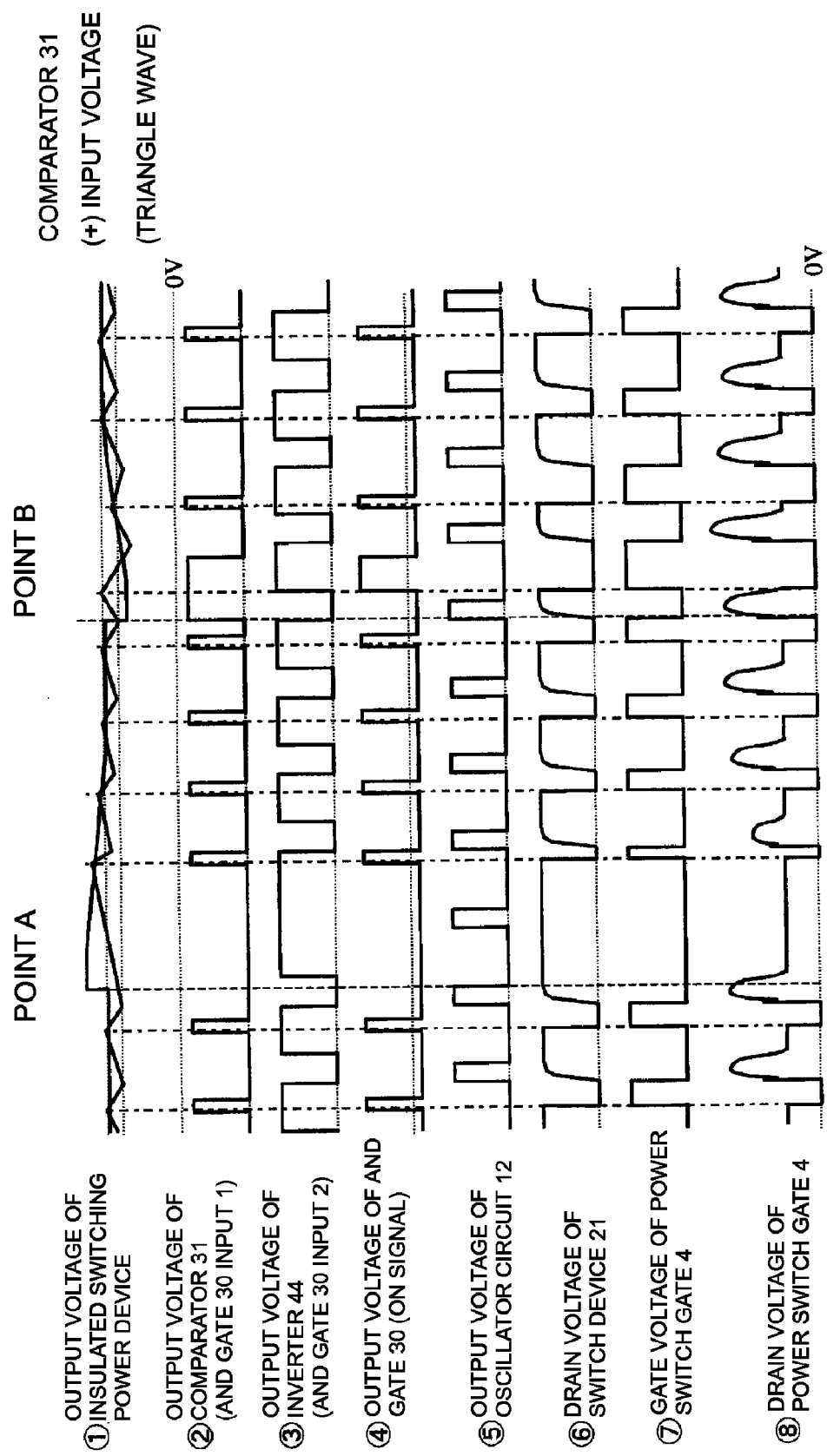
FIG. 5 is a waveform diagram illustrating operating waveforms of the various components of the isolated switching power supply apparatus shown in FIG. 4.

The output voltage increases by the power switch 4 being switched with the maximum on-duty, so in FIG. 5 at the next cycle, the on signal is arranged so as to be output at the timing at which the output of the comparator 31 goes to the H level from the L level, as with at the time of the normal operation. Needless to say, the switching with the maximum on-duty can continue for two cycles or more depending on the degree of increase of the output voltage.

Also, FIG. 5 illustrates, on and after the point B, a situation in which the output voltage is restored to a default value by the PWM control operation of the power switch following the output voltage suddenly increasing due to sudden increase of the input voltage or sudden decrease of the load current.

Following the output of the oscillation circuit 200 going to the H level, and the power switch 4 being turned off, upon the output voltage suddenly increasing at the point B to prevent the voltage of the non-inverting input terminal of the comparator 31 from exceeding the output voltage, the output of the comparator 31 is maintained at the L level, and consequently, the on signal is not output from the AND gate 30. Also, the output of the oscillation circuit 200 goes to the H level, the parasitic capacitance is charged, and the drain of the switch device 21 goes to the H level, so that the output of the NOR gate 41 is maintained at the L level, and the power switch 4 also maintained in the off state. Therefore, even if the output of the oscillation circuit 200 goes to the L level at the next cycle, the power switch 4 is not turned on. Even if the output of the oscillation circuit 200 goes to the L level next, the drain of the switch device 21 is maintained at the H level, such that the power switch is not turned on. This state continues any number of times as required until the voltage of the non-inverting input terminal of the comparator 31 exceeds the output voltage.

When the output of the oscillation circuit 200 is at the L level, upon the output voltage decreasing by the power switch 4 being maintained in the off state, and inversely, the voltage of the non-inverting input terminal of the comparator 31, which rises by the power switch 4 being turned off, exceeding the output voltage, the output of the comparator 31 goes to the H level. At this time, the reset period ends following the power switch 4 being turned off, such that the output of the inverter 44 is at the H level. Therefore, the on signal is output with the change of the output of the comparator 31 from the L level to the H level as a trigger, and the power switch 4 is turned on. The control circuit of the isolated switching power device 120 returns to the normal operation thereafter.

Thus, the control circuit of the isolated switching power device 120 immediately responds to the sudden fluctuation of the output voltage, as shown in the point A and point B in FIG. 5, at the next cycle to control the on-duty ratio, which is a pulse-by-pulse operation, and thus, improves transient responsivity.

Note that with the present preferred embodiment, there is an operational mode in which the pulse width of the power switch driving signal becomes zero, such as immediately following the point B in FIG. 5.

Fourth Preferred Embodiment

Figure 6:
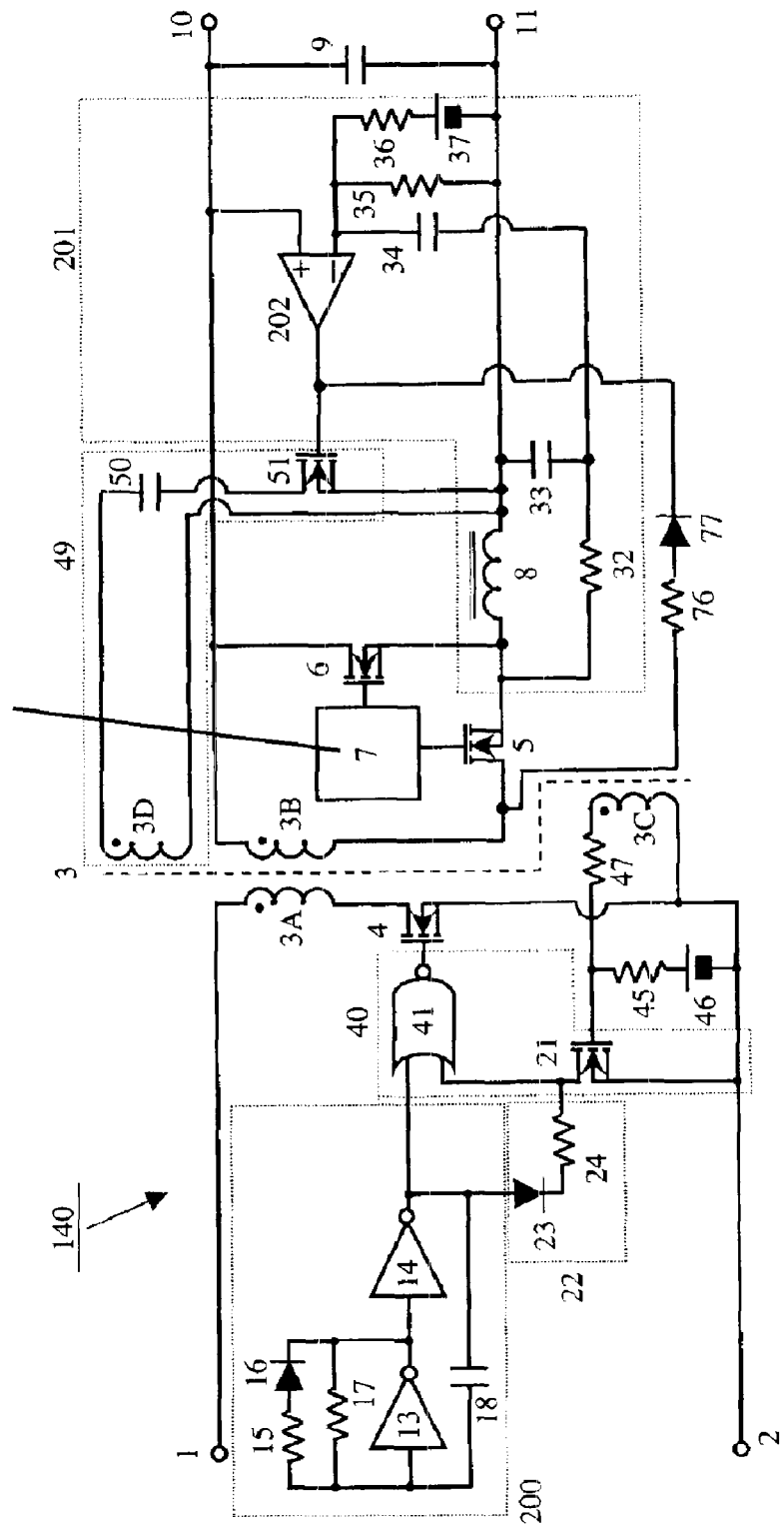
FIG. 6 is a circuit diagram of yet another preferred embodiment of the isolated switching power supply apparatus according to the present invention.

FIG. 6 illustrates a circuit diagram of a fourth preferred embodiment of the isolated switching power device according to the present invention. The isolated switching power supply apparatus 140 shown in FIG. 6 is an active clamp forward converter. In FIG. 6, components which are the same as or equivalent to those in FIG. 4 are denoted with the same reference numerals, and description thereof will be omitted.

With the isolated switching power supply apparatus 140 shown in FIG. 6, in addition to the primary winding 3A and secondary winding 3B, the power transformer 3 further includes a tertiary winding 3C and a quaternary winding 3D.

At the primary side, the gate of the switch device 21 is connected to one end of the tertiary winding 3C of the power transformer 3 via a resistor 47, and the other end of the tertiary winding 3C is connected to the negative side input terminal 2. Also, a resistor 45 and a detection level adjustment voltage source 46 are serially connected between the gate and source of the switch device 21. The tertiary winding 3C, switch device 21, resistors 45 and 47, and detection level adjustment voltage source 46 are a trailing edge detecting unit for detecting the trailing edge of reset pulses from the winding of the power transformer 3. Also, the NOR gate 41 and the switch device 21 define the power switch ON circuit 40 defining a power switch control circuit, in the same manner as in the third preferred embodiment.

At the secondary side, one end of the quaternary winding 3D of the power transformer 3 is connected to the drain of a switch device 51 defining an N-channel MOSFET via a capacitor 50, and the other end of the quaternary winding 3D is connected to the negative side output terminal 11 along with the source of the switch device 51. The quaternary winding 3D, capacitor 50, and switch device 51 define an active clamp circuit 49.

On the other hand, an off-period control circuit 201, defining a timing signal output circuit, is provided at the secondary side. This off-period control circuit 201 is formed by omitting the AND gate 30 and inverter 44 from the off-period control circuit 43, and replacing the comparator 31 with an opencollector type comparator 202. The output of the comparator 202, i.e., the output of the off-period control circuit 201, is connected to the gate of the switch device 51. That is to say, the switch device 51 of the active clamp circuit 49 is configured so as to be controlled by the off-period control circuit 201. Also, a serial circuit of a resistor 76 and diode 77 are provided between the other end of the secondary winding 3B and the gate of the switch device 51, such that the cathode of the diode 77 is connected to the gate of the switch device 51.

The operations of the isolated switching power supply apparatus 140 thus configured will be described with reference to the operation waveforms shown in FIG. 7.

Normal switching operation will be described based on an operating waveform around two cycles beforehand point A in FIG. 7, for example.

First, the power switch 4 turns off according to the output of the oscillator circuit 200. Thus, the turn-off timing of the power switch 4 is dependent on the leading edge of the output of the oscillator circuit 200 at the primarily side. That is to say, the turn-off timing of the power switch 4 is controlled at the primary side.

Immediately previous to this, the voltage at the inverting input terminal of the comparator 202 is dropping, as will be described later, and is lower than the output voltage, with the output of the comparator 202 in an open state. Also, the gate voltage of the switch device 51 is also low, with the switch device 51 in an off state.

Upon the power switch 4 turning off, voltage at the inverting input terminal of the comparator 202 rises. In the same manner, upon the power switch 4 turning off, pulse voltage is generated at each winding of the power transformer 3, in accordance with the LC resonance of the parasitic capacitance equivalently existing at the power transformer 3 excitation inductance and power switch 4 ends. A DC voltage with the quaternary winding 3D side as (−) and the switch device 51 side as (+) is applied to the capacitor 50, but in the event of a voltage which is greater than the DC voltage applied to the capacitor being generated by the LC resonance at the ends of the quaternary winding 3D, the parasitic diode of the switch device 51 (MOSFET) conducts and current flows, such that a further DC charge is accumulated at the capacitor 50. At this time, the operations are those of the capacity of the LC resonance being added to the capacity of the capacitor 50, and the cycle of the LC resonance instantaneously becomes longer, such that the reset pulse voltage of the power transformer 3 has a waveform which is maintained at approximately a constant value.

While the parasitic diode of the switch device 51 is conducting, the charge flowing in from the other end of the secondary winding 3B of the transformer via the resistor 76 and diode 77 is accumulated in the capacitance between the gate and source of the switch device 51, and the switch device 51 turns on. Accordingly, the current which had been flowing through the parasitic diode of the switch device 51 primarily flows between the drain and source (in the source→drain direction).

When the LC resonance advances to where discharging of the electromagnetic energy stored in the excitation inductance of the power transformer 3 ends, a reverse-direction current (in the drain→source direction) flows to the switch device 51 which is in an on state, due to the DC charge of the capacitor 50. In addition, at this time, the reset pulse voltage of the power transformer 3 is in a state of being maintained at a constant value.

Although the voltage of the inverting input terminal of the comparator 202 has shifted to rising due to the power switch 4 turning off, in the event that this voltage exceeds the output voltage at this stage, the output of the comparator 202 goes to the L level, and the switch device 51 turns off. Accordingly, the effects of the capacitor 50 are removed from the capacitance of the LC resonance, such that the LC resonance cycle instantaneously becomes shorter, and the reset pulse voltage of each of the windings of the power transformer 3 drops rapidly. Upon the detecting unit configured of the tertiary winding 3C, resistors 45 and 47, and the detection level adjustment voltage source 46 detecting that the reset pulse voltage has dropped to AC about 0 V or lower, the switch device 21 turns on and one input of the NOR gate goes to the L level, whereby the power switch 4 turns on.

Thus, with the isolated switching power supply apparatus 140, controlling the switch device 51 of the active clamp circuit 49 with the off-period control circuit 43 utilizes the reset pulse voltage occurring at each winding of the power transformer 3 as an off signal (timing signal), detected at the trailing edge detecting unit so as to turn on the power switch 4.

As can be understood from this, the output of the comparator 202 switching to the L level defines an on signal of the power switch 4, i.e., a timing signal. Also, the tertiary winding 3C and quaternary winding 3D of the power transformer 3 essentially define a timing signal transfer circuit. The turn-off timing of the power switch 4 is controlled at the secondary side.

Upon the power switch 4 turning on, the inverting input terminal of the comparator 202 drops. Upon the voltage of the inverting input terminal dropping below the output voltage, the output of the comparator 202 goes from the L level to an open state. Even when the output of the comparator 202 is in an open state, there is no current flowing into the switch device 51 via the resistor 76 and diode 77 in a state in which the power switch 4 is on, so the switch device 51 remains off. Also, the voltage of the inverting input terminal remains in the dropping state.

Subsequently, the power switch 4 turns off in accordance with the output of the oscillation circuit 200, upon which the above-described operations are repeated.

With the isolated switching power supply apparatus 140, during normal operations, the switching operations of the power switch 4 are repeated at the oscillation frequency of the oscillation circuit 200.

Note that the oscillation frequency of the oscillation circuit 200 is determined by a multi-vibrator constant, such that the isolated switching power device 140 is operated with a substantially fixed switching frequency. The state of the output of the isolated switching power does not affect the oscillation circuit 200. Therefore, no fluctuation of the switching frequency due to the output state occurs, thereby facilitating design of the isolated switching power.

Also, as with the other preferred embodiments, the control circuit of the isolated switching power device 140 operates with pulse-by-pulse operations, and accordingly, provides excellent transient responsivity, and has an advantage wherein the fluctuation of the output voltage can be suppressed even if there is sudden fluctuation in the input voltage or output electric current.

Figure 7:
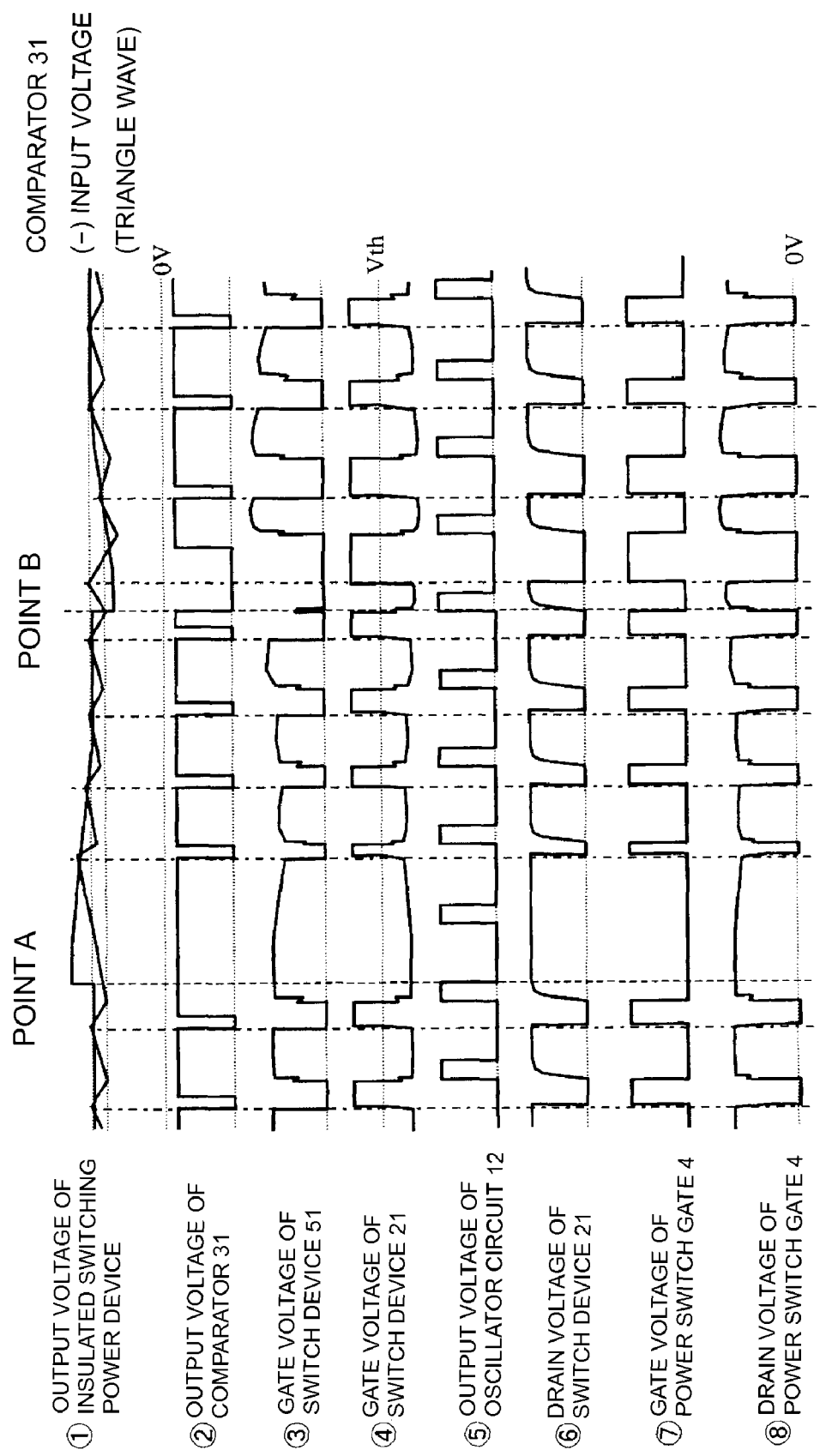
FIG. 7 is a waveform diagram illustrating operating waveforms of the various components of the isolated switching power supply apparatus shown in FIG. 6.

Note that while FIG. 7 illustrates the manner in which the output voltage is restored to the specified value following a sudden drop or rise thereof, the basic operations thereof are the same as with the third preferred embodiment, and accordingly description thereof will be omitted here.

Fifth Preferred Embodiment

Figure 8:
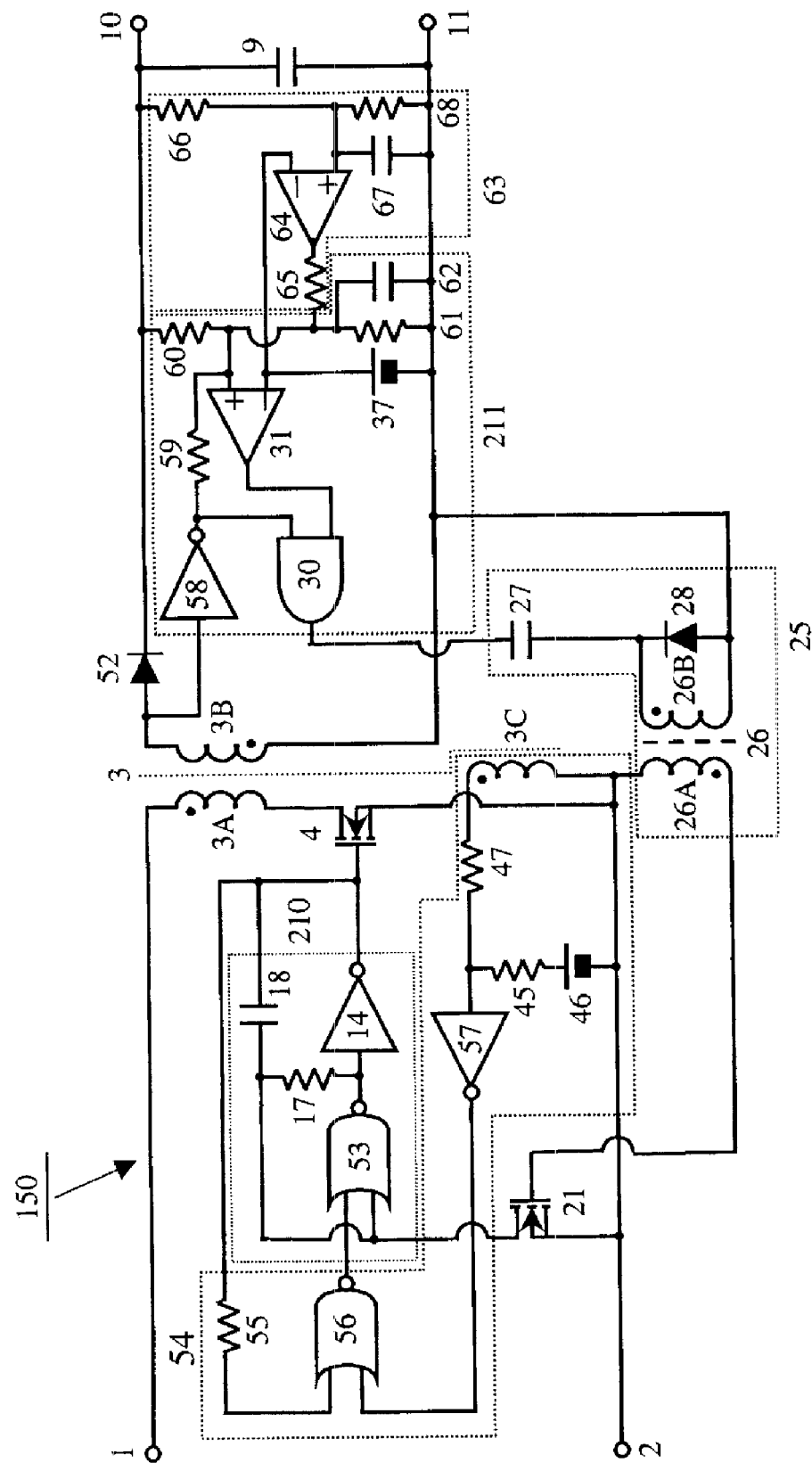
FIG. 8 is a circuit diagram of yet another preferred embodiment of the isolated switching power supply apparatus according to the present invention.

FIG. 8 illustrates a circuit diagram of a fifth preferred embodiment of the isolated switching power device according to the present invention. The isolated switching power device 150 illustrated in FIG. 8 is not a forward converter as with the preferred embodiments described above, and instead, is a flyback converter with frequency control for performing zero-voltage switching (ZVS).

With the isolated switching power device 150 shown in FIG. 8, the power transformer 3 has, in addition to the primary winding 3A and secondary winding 3B, the tertiary winding 3C. One end of the primary winding 3A is connected to the positive side input terminal 1, and the other end is connected to the negative side input terminal 2 via the power switch 4 made up of an N-channel MOSFET.

An oscillation circuit 210 including a NOR gate 53, inverter 14, resistor 17, and capacitor 18 is provided at the primary side. One input of the NOR gate 53 is connected to the output of a later-described NOR gate 56. The output of the NOR gate 53 is connected to the inverter 14, and a serial circuit including a resistor 17 and a capacitor 18 is connected between the input/output of the inverter 14. Also, the contact point between the resistor 17 and capacitor 18 is connected to the other input of the NOR gate 53. Further, the other input of the NOR gate 53 is connected to the negative side terminal 2 via the switch device 21. The output of the inverter 14 is the output of the oscillation circuit 210.

The oscillation circuit 210 oscillates in accordance with the time constant determined by the resistor 17 and capacitor 18. Note that the switching frequency of the isolated switching power device 150 changes according to the load state, but the oscillation frequency of the oscillation circuit 210 is set to about ½ the lower limit of the anticipated switching frequency (switching frequency under heavy loading). Accordingly, with the isolated switching power device 150, the oscillation circuit 210 does not determine the switching frequency of normal operations. Also, as described later, this does not provide the timing for switching of the power switch 4.

The output of the oscillation circuit 210 is connected to the gate of the power switch 4. Also, the output of the oscillation circuit 210 is connected to one input of the NOR gate 56 via the resistor 55. One end of the tertiary winding 3C is connected to the other input of the NOR gate 56 via the resistor 47 and inverter 57. The other end of the tertiary winding 3C is connected to the negative side input terminal 2. A serial circuit including the resistor 45 and detection level adjustment voltage source 46 is connected between the input of the inverter 57 and the other end of the tertiary winding 3C. The tertiary winding 3C, resistors 45, 47, and 55, detection level adjustment voltage source 46, inverter 57, and NOR gate 56 define a zero-voltage state detecting circuit 54.

Further, the primary winding 26A of the signal transformer 26 is connected between the gate and source of the switch device 21.

One end of the secondary winding 3B of the power transformer 3 is connected to the negative side output terminal 11, and the other end is connected to the positive side output terminal 10 via the diode 52. A smoothing capacitor 9 is connected between the positive side output terminal 10 and the negative side output terminal 11.

A comparator 31 is provided at the secondary side, with the non-inverting input terminal thereof being connected to the contact point between the resistors 60 and 61 provided serially between the positive side output terminal 10 and the negative side output terminal 11. Also, a reference voltage source 37 is provided for generating a predetermined reference voltage as to the negative-side output terminal 11, and the output thereof is connected to the non-inverting input terminal of the comparator 31. Further, the connecting point of the other end of the secondary winding 3B and the diode 52 is connected to the negative side output terminal 11 via the inverter 58 and resistor 59 in that order, and the contact point of the resistor 59 and capacitor 62 is also connected to the non-inverting input terminal of the comparator 31.

The output of the comparator 31 is connected to one input of the AND gate 30. The output of the inverter 58 is connected to the other input of the AND gate 30. The output of the AND gate 30 is connected to the negative side output terminal 11 via the capacitor 27 and the secondary winding 26B of the signal transformer 26. The diode 28 is connected to both ends of the secondary winding 26B.

The comparator 31, reference voltage source 37, resistors 59, 60, and 61, capacitor 62, AND gate 30, and inverter 58 define an on-period control circuit 211 defining a timing signal output circuit. Also, the capacitor 27, diode 28, and signal transformer 26 define an isolated signal transfer circuit 25 defining timing signal transfer circuit.

Further a static deviation reduction circuit 63 is provided for reducing the static deviation of the controlled variable and the target value as to disturbance in a manner more moderate than the on-period control circuit 211. The static deviation reduction circuit 63 includes an error amplifier 64, resistors 65, 66, and 68, and a capacitor 67, and is configured to compare the reference voltage source 37, which is the target value, with the output voltage, which is the control voltage divided by the resistors 66 and 68, so as to feedback generated error signals to the contact point of the resistors 60 and 61.

The control operations of the static deviation reduction circuit 63 are the same in principle as traditional voltage mode PWM control, and are affected by the cutoff frequency of the error amplifier 64 and the cutoff frequency of the output filter. In order to prevent abnormal oscillation, transient responsivity must be controlled and phase margin and gain margin must be provided. With the fifth preferred embodiment, phase margin and gain margin are provided by delaying the divided voltage of the output voltage from the resistors 66 and 68 with the capacitor 67. Static output voltage precision can be improved with the static deviation reduction circuit 63.

The operations of the isolated switching power device 150 will be described with reference to the operation waveforms shown in FIG. 9.

With the isolated switching power device 150, the controlled variable is the output voltage, and the target value is the voltage value of the reference voltage source to stabilize the output voltage. The DC input voltage applied between the positive side input terminal 1 and the negative side input terminal 2 is switched by the power switch 4 connected via the primary winding 3A of the power transformer, so as to be converted into AC. Electromagnetic energy accumulated at the core of the power transformer 3 during the on-period of the power switch 4 is output to the secondary winding 3B of the transformer 3 during the power switching off period, thereby rectifying with the rectifying diode 52 and smoothing with the smoothing capacitor 9, and DC is output from the positive side output terminal 10 and the negative side output terminal 11.

First, in a state in which the output of the oscillation circuit 210 is at the L level and the power switch 4 is off, upon discharge ending of the electromagnetic energy accumulated at the core of the power transformer 3 in the on period of the power switch 4 to the secondary side, the drain voltage of the power switch 4 begins to drop in accordance with the LC resonance of the parasitic capacity equivalently existing at the power transformer 3 excitation inductance and power switch 4 ends. The zero-voltage state detecting circuit 54 indirectly detects dropping of the drain voltage of the power switch 4 from the voltage generated at the tertiary winding 3C of the power transformer 3, and adjusts the amplitude and DC level of the tertiary winding 3C of the power transformer 3 with the resistors 45 and 47 and the detection level adjustment voltage source 46 (see operation waveform (6) in FIG. 9) before input to the inverter 57. Adjustment should be performed such that the output voltage of the tertiary winding 3C of the power transformer 3 is at the threshold value of the inverter 57, at approximately AC 0 V. Dropping of the drain voltage of the power switch 4 raises the voltage of the tertiary winding 3C of the power transformer 3, and upon exceeding the threshold value of the inverter 57, the output of the inverter 57 switches from the H level to the L level.

Note that the output of the oscillation circuit 210 up to immediately prior to this is at the L level, such that one input of the NOR gate 56 connected to the output of the oscillation circuit 210 via the resistor 55 is also at the L level. Also, the output of the inverter 57 is at the H level, such that the output of the NOR gate 56, i.e., one input of the NOR gate 56, is at the L level. Also, note that the other input of the NOR gate 53 is at the L level, but is rising toward the threshold value.

Figure 9:
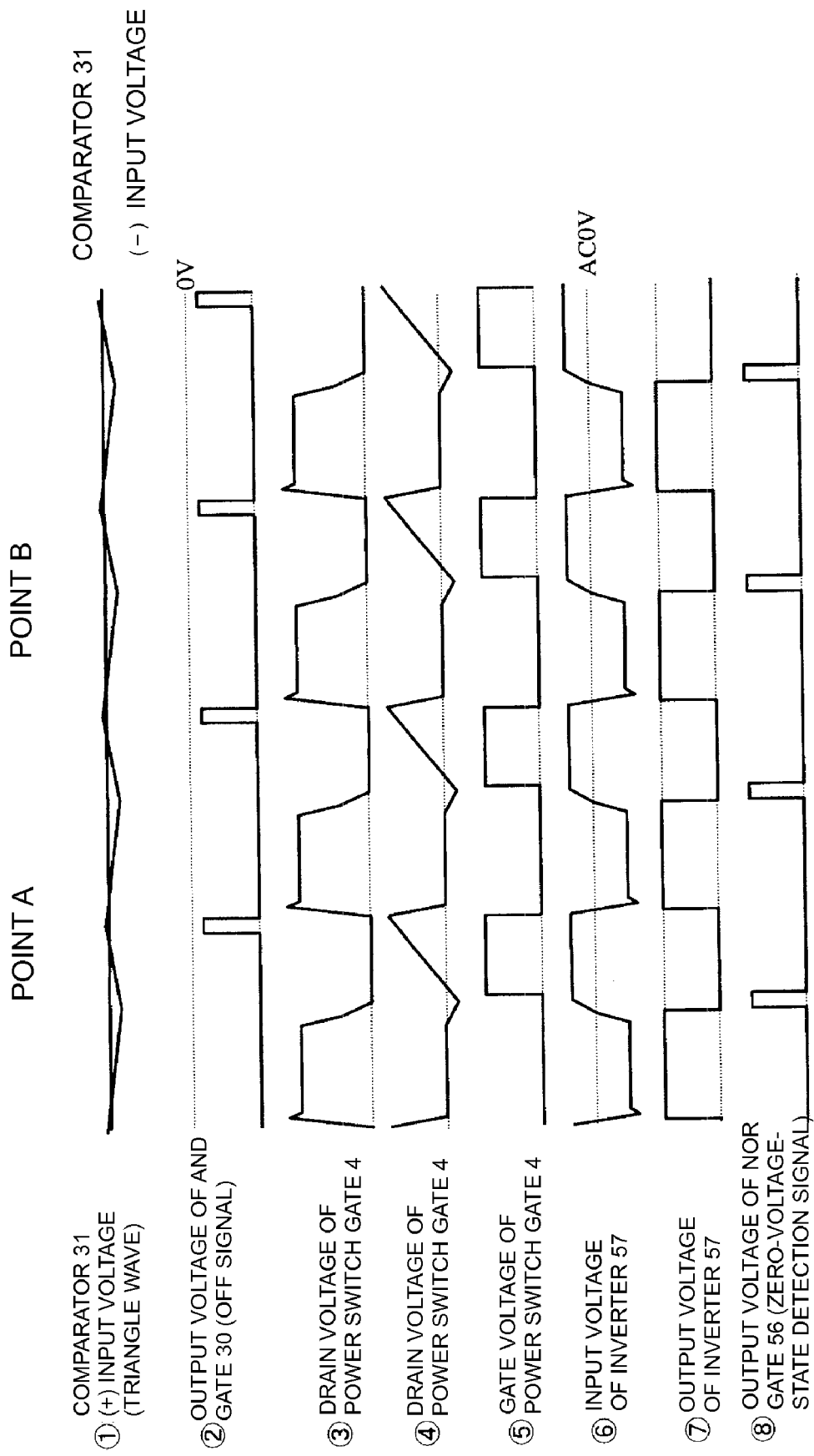
FIG. 9 is a waveform diagram illustrating operating waveforms of the various components of the isolated switching power supply apparatus shown in FIG. 8.

Upon the output of the inverter 57 going from the H level to the L level, both inputs of the NOR gate 56 go to the L level, such that the output thereof is at the H level (zero-voltage state detecting signal, see operating waveform (8) in FIG. 9). Upon the output of the NOR gate 56 going to the H level, the output of the NOR gate 56 goes to the L level, and the output of the inverter 14 (i.e., the output of the oscillation circuit 210) goes to the H level, and the power switch 4 turns on. At this time, the power switch 4 is operated with zero-voltage switching, and switching loss reduction and EMI reduction are achieved.

However, at the instant that the voltage of the tertiary winding 3C of the power transformer exceeds the threshold value of the inverter 57, the drain voltage of the power switch 4 has only dropped as far as the input voltage, so there is the need to provide a delay time for delaying the on timing of the power switch 4. The several tens of nsec occurring at the process of propagation of the signal over NOR gate 56→NOT gate 53→inverter 14 can also be used for this delay time. The resistor 55 prevents erroneous operation in which a zero-voltage state detection signal is generated at the timing immediately following the power switch 4 going off, by delaying the gate voltage of the power switch 4 input to the NOR gate.

Thus, the power switch 4 turns on, triggered by discharge ending of the electromagnetic energy accumulated in the core of the power transformer 3 to the secondary side. The on period of the power switch 4 is dependent on the magnitude of the electromagnetic energy accumulated at the power transformer 3, which is dependent on the length of the on period of the power switch 4. Accordingly, the length of the off period of the power switch 4 is automatically determined in accordance with the length of the on period of the power switch, and there is no mechanism for directly controlling the length of the off period.

Due to the output of the oscillation circuit 210 switching to the H level, the other input of the NOR gate 53 exceeds the threshold value and goes to the H level, and begins dropping toward the threshold value for the next output inversion. On the other hand, upon the output of the oscillation circuit 12 switching to the H level, one input of the NOR gate 56 goes to the H level after a period of time, and since both inputs are at the H level, the output, i.e., one input of the NOR gate 53, goes to the L level.

Voltage obtained by dividing the output voltage with the resistors 60 and 61 is input to the non-inversion input terminal of the comparator 31, and the reference voltage of the reference voltage source 37 is directly input to the inversion input terminal, so as to indirectly compare the controlled variable and target value. The voltage at both ends of the secondary winding 3B of the power transformer 3 is inverted at the inverter 58, and ramp voltage integrated at the resistor 59 and capacitor 62 is superimposed at the contact point between the resistors 60 and 61. In other words, ramp voltage is indirectly superimposed on the output voltage which is the controlled variable, using voltage dividing resistors. The output ripple voltage is inversely inclined from the ramp voltage, and acts to weaken the inclination of the ramp voltage, such that the amplitude of the ramp voltage must be set so as to be greater than the output ripple voltage. The voltage of the non-inverting input terminal of the comparator 31 which had been dropping at the time of the power switch 4 being off, shifts to rising with the power switch 4 turning on.

In the event that the voltage of the non-inverting input terminal of the comparator 31 which had been rising following the power switch 4 turning on exceeds the fixed voltage applied to the inverting input terminal, the output of the comparator 31 switches from the L level to the H level. While the output of the comparator 31 is applied to the other input of the AND gate 30, the output of the inverter 58 is applied to one input of the AND gate 30. The output of the inverter 58 is a signal obtained by inverting the voltage at both ends of the secondary winding 3B of the power transformer 3, and the period of H level thereof approximately matches the on period of the power switch 4. That is to say, the on period of the power switch 4 is essentially detected. During the on period, the other input of the AND gate 30 is at the H level, such that upon the output of the comparator 31 going to the H level, the output of the AND gate 30 is at the H level, and is input to the isolation signal transfer circuit 25 as an off signal (timing signal).

The off signal input to the isolation signal transfer circuit 25 has the DC component thereof cut at the capacitor 27, and is transferred to the primary winding 26A from the secondary winding 26B at the signal transformer 26. The diode 28 functions to reset the core of the signal transformer 26 excited during transfer of the off signal.

Note that the AND gate 30 is used to generate an off signal at an optimal timing at the time of the voltage of the non-inverting input terminal exceeding the voltage of the inverting input terminal over the entire region of the power switch on period. In such a state, the output voltage exceeds the stipulated value, such that the on-duty ratio of the power switch 4 must be narrowed to a minimum without going to zero, but the output of the comparator 31 is at the H level from the off period before the power switch on period, and an off signal cannot be generated based on the timing for switching to the H level. Accordingly, inputting the voltage obtained by inverting the voltage at both ends of the secondary winding 3B of the power transformer 3, and the output of the comparator 31, to the AND gate 30, generates an off signal as soon as the power switch on period starts, and the on-duty ratio of the power switch 4 becomes minimal. In other words, upon detection that the divided voltage of the output voltage input to one side of the comparator 31 is greater than the reference voltage input to the other side of the comparator 31 at the start of the on period, an off signal is immediately generated to turn the power switch 4 off.

Upon the off signal being transferred to the primary side via the signal transformer 26, the switch device 21 temporarily turns on, and the other input of the NOR gate 53 is forcibly changed from the H level to the L level. One input of the NOR gate 53 is already at the L level, so the output from the NOR gate 53 switches from the L level to the H level, and the output of the inverter 14 (the output of the oscillation circuit 210) switches from the H level to the L level. Accordingly, the power switch 4 is turned off. Thus, the turn-off timing of the power switch 4 is controlled on the secondary side. Accordingly, the off signal functions as a timing signal in the isolated switching power device 150.

Note that the switch device 21 only temporarily turns on, such that when the power switch 4 turns off, this returns to the off state again, and the oscillation circuit 210 can perform oscillating operations.

Upon the power switch turning off, the pulse voltage shown as operation waveform (3) in FIG. 9 is generated at the drain of the power switch 4, and pulse voltage having a similar shape also appears at each of the windings of the power transformer 3. Upon the voltage at both ends of the secondary winding 3B of the power transformer 3 exceeding the output voltage of the isolated switching power device 150, the rectifying diode 52 conducts, and the electromagnetic energy accumulated at the core of the power transformer 3 during the on period of the power switch 4 begins to be discharged to the secondary side.

Due to the power switch 4 turning off, the voltage at both ends of the secondary winding 3B of the power transformer 3 is inverted, and the output of the inverter 58 is at the L level. Accordingly, the output of the AND gate 30 to which this is input returns to the L level. Also, due to the output of the inverter 58 going to the L level, the inclination of the ramp voltage integrated therewith by the resistor 59 and capacitor 62 changes, the voltage of the non-inverting input terminal of the comparator 31 drops, and quickly falls below the fixed voltage applied to the inverting input terminal. Accordingly, the output of the comparator 31 goes from the H level to the L level, but the output of the AND gate 30 to which this is input is already at the L level, and there is no particular change regarding circuit operations.

In accordance with the power switch 4 turning off, the voltage of the tertiary winding 3C is inverted, the input of the inverter 57 goes to the L level, and the other input of the NOR gate 56 goes to the H level. Accordingly, the output of the NOR gate 56 is at the L level, and the oscillation circuit 210 can perform oscillating operations. Due to the output of the oscillation circuit 210 switching from the H level to the L level, the other input of the NOR gate 53 exceeds the threshold value and goes to the L level, and begins rising toward the threshold value for the next output inversion. Note that following the output of the oscillation circuit 210 going to the L level, one input of the NOR gate 56 goes to the L level after a period of time, but at this stage, the other input of the NOR gate 56 is at the H level, so the output thereof does not change.

Upon ending of the electromagnetic energy accumulated in the core of the power transformer 3 being discharged to the secondary side, the power switch 4 turns on again, and subsequently, the above-described operations are repeated. The isolated switching power device 150 controls the on period of the power switch 4 for controlling the output voltage, and the off period is determined according to the on period thereof, consequently changing the switching frequency, thereby achieving frequency control.

Note that the circuit configuration enables switching of the power switch 4 at the oscillation frequency of the oscillation circuit 210 as well. Note however, that the oscillation frequency of the oscillation circuit 210 is set sufficiently low, and moreover, that the oscillation operations are reset each time the power switch 4 is switched, such that in normal operations, there is basically no switching of the power switch 4 by output inversion of the oscillation circuit 210 itself before the above-described turn-on or turn-off conditions are satisfied.

Thus, with the isolated switching power device 150 as well, turn-off control of the power switch 4 operates with pulse-by-pulse operations, and accordingly, achieves excellent transient responsivity.

Also, the off signal (timing signal) transferred from the secondary side to the primary side is a signal carrying information of only the change in output of the AND gate, and the frequency of the signal is a higher frequency than the switching frequency. Accordingly, the signal transferring transformer 26 can be reduced in size and price.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An isolated switching power supply apparatus comprising:
   a power transformer including at least a primary winding and a secondary winding;
   at least one power switch arranged to switch current flowing through said primary winding;
   a rectifying circuit and a smoothing circuit connected to said secondary winding, wherein control is provided such that a controlled variable of output approaches a target value by controlling turning on and off of said power switch;
   a timing signal output circuit, provided on the secondary side, arranged to output an output voltage to cause said power switch to perform a switching operation of one of turn-on or turn-off, based on a change in said controlled variable;
   a timing signal transfer circuit arranged to transfer a timing signal defined only by a level change of the output voltage of the timing signal output circuit from the secondary side to the primary side in an isolated manner;
   a power switch control circuit, provided to the primary side, arranged to cause said power switch to perform switching operations based on said timing signal.

2. The isolated switching power supply apparatus according to claim 1, further comprising:
   at the primary side, an oscillation circuit arranged to output signals for switching said power switch at a certain cycle and a certain time ratio; wherein
   in the event that a switching operation is performed by said timing signal, a signal for performing switching operation in the same direction as said timing signal output from said oscillation circuit is masked.

3. The isolated switching power supply apparatus according to claim 2, further comprising a multiple driving prevention circuit arranged to forbid switching of said power switch, in the event that a switching operation is performed by said timing signal, until a switching operation is performed in the reverse direction by a signal output from said oscillation circuit next.

4. The isolated switching power supply apparatus according to claim 2, wherein said power switch is turned on at a certain cycle with an output signal of said oscillation circuit, and said power switch is turned off with said timing signal.

5. The isolated switching power supply apparatus according to claim 2, wherein said power switch is turned off at a certain cycle with an output signal of said oscillation circuit, and said power switch is turned on with said timing signal.

6. The isolated switching power supply apparatus according to claim 1, wherein said power switch is arranged to automatically perform a switching operation opposite to the switching operation by said timing signal.

7. The isolated switching power supply apparatus according to claim 6, wherein said power switch is turned off with said timing signal, and said power switch is automatically turned on following an off period of a length corresponding to the on period.

8. The isolated switching power supply apparatus according to claim 1, wherein said timing signal transfer circuit is a signal transformer provided between said primary side and said secondary side.

9. The isolated switching power supply apparatus according to claim 8, wherein said signal transformer is defined by a composite magnetic component sharing the same core as a choke coil, which is a component of said power transformer or said smoothing circuit.

10. The isolated switching power supply apparatus according to claim 1, wherein said timing signal transfer circuit is a signal transfer capacitor provided between said primary side and said secondary side.

11. The isolated switching power supply apparatus according to claim 10, further comprising a multi-layer circuit substrate upon which said power transformer is mounted, wherein a capacitance between patterns provided in said multi-layer circuit substrate across an insulating layer is used as said signal transfer capacitor.

12. The isolated switching power supply apparatus according to claim 1, said power transformer further comprising a tertiary winding arranged to change the reset voltage of said power transformer based on said timing signal, and a quaternary winding arranged to detect change in the reset voltage of said power transformer, wherein said power transformer also function as said timing signal transfer circuit.

13. The isolated switching power supply apparatus according to claim 12, further comprising, at the secondary side, an active clamp circuit including said tertiary winding, a capacitor and a switch device, wherein said switch device is turned off with said timing signal.

14. The isolated switching power supply apparatus according to claim 1, wherein said timing signal output circuit compares, either directly or indirectly with a comparator, said controlled variable and the target value thereof, after starting of a period wherein said timing signal can be output, and outputs, as a timing signal, the timing at which the magnitude relation of two inputs of said comparator switches over and the output switches over.

15. The isolated switching power supply apparatus according to claim 14, wherein in the event that conditions under which to output said timing signal at the time of starting a period wherein said timing signal can be output are satisfied, said timing signal output circuit immediately outputs said timing signal.

16. The isolated switching power supply apparatus according to claim 14, further comprising a ramp voltage superimposing circuit arranged to superimpose, on one of said controlled variable and said target value, ramp voltage synchronous with the switching of said power switch, either directly or indirectly.

17. The isolated switching power supply apparatus according to claim 16, further comprising an output choke coil at the secondary side, wherein said ramp voltage is generated using an integrated waveform of said output choke coil.

18. The isolated switching power supply apparatus according to claim 14, further comprising a static deviation reduction circuit arranged to reduce static deviation of said controlled variable and said target value by responding to disturbance more moderately than with said timing signal output circuit.

* * * * *